US010268654B2

(12) United States Patent
Bosarge et al.

(10) Patent No.: US 10,268,654 B2
(45) Date of Patent: *Apr. 23, 2019

(54) ACCESSING CONTENT FROM SUPPRESSED URL INDEX

(71) Applicant: Cake Technologies, Inc., South Jordan, UT (US)

(72) Inventors: Jason Bosarge, South Jordan, UT (US); D. Levi King, San Mateo, CA (US)

(73) Assignee: Cake Technologies, Inc., South Jordan, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/462,582

(22) Filed: Mar. 17, 2017

(65) Prior Publication Data
US 2017/0323020 A1 Nov. 9, 2017

Related U.S. Application Data

(60) Provisional application No. 62/310,811, filed on Mar. 21, 2016, provisional application No. 62/384,499, filed on Sep. 7, 2016, provisional application No. 62/409,736, filed on Oct. 18, 2016, provisional application No. 62/432,989, filed on Dec. 12, 2016, (Continued)

(51) Int. Cl.
G06F 16/9535 (2019.01)
G06F 16/955 (2019.01)
G06F 16/951 (2019.01)
G06F 16/954 (2019.01)

(52) U.S. Cl.
CPC ........ *G06F 16/9535* (2019.01); *G06F 16/951* (2019.01); *G06F 16/954* (2019.01); *G06F 16/9566* (2019.01)

(58) Field of Classification Search
CPC .................................................. G06F 17/30867
See application file for complete search history.

(56) References Cited

U.S. PATENT DOCUMENTS

2008/0071743 A1  3/2008  Jhaveri et al.
2011/0173569 A1  7/2011  Howes et al.
(Continued)

OTHER PUBLICATIONS

Palser, Barb. "Spread the Carousel Love." Relay Media, Mar. 6, 2016, https://web.archive.org/web/20160406111143/https:/www.relaymedia.com/2016/03/06/spread-the-carousel-love/. Accessed Oct. 11, 2017.
(Continued)

*Primary Examiner* — Kris E Mackes
(74) *Attorney, Agent, or Firm* — Workman Nydegger

(57) ABSTRACT

Systems, methods and devices are provided for generating and suppressing indexes that are utilized for navigating content. After a search query is processed, search results are received. These search results comprise a URL listing, or other webpage listing, identified in the search results. Then, prior to and without rendering the particular URL/webpage listing, a particular webpage is identified from the search results. The system initiates a request for the particular webpage prior to rendering the URL/webpage listing. That URL/webpage is then accessed and displayed automatically, while providing a one input link to the URL/webpage listing, and sometimes without or at least prior to displaying the URL/webpage listing.

20 Claims, 33 Drawing Sheets

Related U.S. Application Data provisional application No. 62/472,347, filed on Mar. 16, 2017.

(56) References Cited

U.S. PATENT DOCUMENTS

| | | | |
|---|---|---|---|
| 2012/0278704 A1 | 11/2012 | Ying et al. |
| 2013/0021377 A1 | 1/2013 | Doll |
| 2013/0024757 A1 | 1/2013 | Doll et al. |
| 2013/0097186 A1 | 4/2013 | van Hoff |
| 2013/0111395 A1 | 5/2013 | Ying et al. |
| 2013/0219255 A1 | 8/2013 | van Hoff et al. |
| 2014/0019868 A1 | 1/2014 | Varian |
| 2014/0074624 A1 | 3/2014 | Ying et al. |
| 2014/0074863 A1 | 3/2014 | Walkingshaw et al. |
| 2014/0074934 A1 | 3/2014 | van Hoff et al. |
| 2014/0075275 A1 | 3/2014 | Aleksandrovsky et al. |
| 2014/0075289 A1 | 3/2014 | Brant |
| 2014/0075339 A1 | 3/2014 | Weskamp et al. |
| 2014/0198127 A1 | 7/2014 | Ying |
| 2014/0207748 A1* | 7/2014 | Sood ............... G06F 17/3097 |
| | | | 707/706 |
| 2014/0229477 A1 | 8/2014 | Costello et al. |
| 2014/0245128 A9 | 8/2014 | Brant |
| 2014/0320535 A1 | 10/2014 | Ying |
| 2014/0351268 A1 | 11/2014 | Weskamp et al. |
| 2015/0013009 A1 | 1/2015 | Milener et al. |
| 2015/0015614 A1 | 1/2015 | Doll |
| 2015/0019943 A1 | 1/2015 | Ying et al. |
| 2015/0019957 A1 | 1/2015 | Ying et al. |
| 2015/0019958 A1 | 1/2015 | Ying et al. |
| 2015/0049093 A1 | 2/2015 | Doll et al. |
| 2015/0100587 A1 | 4/2015 | Walkingshaw et al. |
| 2015/0121297 A1 | 4/2015 | Ying et al. |
| 2015/0149261 A1 | 5/2015 | Walkingshaw et al. |
| 2015/0169744 A1 | 6/2015 | Walkingshaw et al. |
| 2015/0193508 A1 | 7/2015 | Christensen et al. |
| 2015/0199708 A1 | 7/2015 | Ying et al. |
| 2015/0213492 A1 | 7/2015 | Aleksandrovsky |
| 2015/0213610 A1 | 7/2015 | Guo et al. |
| 2015/0227563 A1 | 8/2015 | Walkingshaw et al. |
| 2015/0244830 A1 | 8/2015 | Rietveld et al. |
| 2015/0248406 A1 | 9/2015 | Walkingshaw |
| 2015/0248425 A1 | 9/2015 | Walkingshaw |
| 2015/0248683 A1 | 9/2015 | Walkingshaw |
| 2015/0350271 A1 | 12/2015 | Weskamp et al. |
| 2015/0356950 A1 | 12/2015 | Doll |
| 2015/0363407 A1 | 12/2015 | Huynh et al. |
| 2015/0370432 A1 | 12/2015 | Ying et al. |
| 2015/0370777 A1 | 12/2015 | Ying et al. |
| 2015/0379012 A1 | 12/2015 | Awadallah et al. |
| 2016/0005196 A1 | 1/2016 | Awadallah et al. |
| 2016/0012053 A1 | 1/2016 | Weening et al. |
| 2016/0034143 A1 | 2/2016 | Sharma |
| 2016/0085729 A1 | 3/2016 | Chi et al. |
| 2016/0085730 A1 | 3/2016 | Chang et al. |
| 2016/0124911 A1 | 5/2016 | Ying |
| 2016/0124918 A1 | 5/2016 | Ying |
| 2016/0171954 A1 | 6/2016 | Guo |
| 2016/0202861 A1 | 7/2016 | Weskamp |
| 2016/0224557 A1 | 8/2016 | Chi et al. |
| 2016/0231894 A1 | 8/2016 | Ying et al. |
| 2016/0232134 A1 | 8/2016 | Doll et al. |
| 2016/0234290 A1 | 8/2016 | Sharma |
| 2016/0253292 A1 | 9/2016 | Ying et al. |
| 2016/0299654 A1 | 10/2016 | Mai et al. |
| 2016/0323281 A1 | 11/2016 | Griesmeyer |
| 2016/0349941 A1 | 12/2016 | Johnsen |
| 2017/0046328 A1 | 2/2017 | Ying et al. |
| 2017/0075533 A1 | 3/2017 | Schaad |
| 2017/0078239 A1 | 3/2017 | Chi et al. |
| 2017/0078413 A1 | 3/2017 | Chi et al. |
| 2017/0103547 A1 | 4/2017 | Guo |
| 2017/0123611 A1 | 5/2017 | Hawkins |
| 2017/0124590 A1 | 5/2017 | Griesmeyer |
| 2017/0134406 A1 | 5/2017 | Guo et al. |
| 2017/0139562 A1 | 5/2017 | Olson |
| 2017/0154117 A1 | 6/2017 | Christensen et al. |
| 2017/0161782 A1 | 6/2017 | Wigder |
| 2017/0206192 A1 | 7/2017 | Ying |
| 2017/0220216 A1 | 8/2017 | Thompson et al. |
| 2017/0220580 A1 | 8/2017 | Chi et al. |
| 2017/0228463 A1 | 8/2017 | Sharma |
| 2017/0257431 A1 | 9/2017 | Zhao |
| 2017/0264934 A1 | 9/2017 | Guo et al. |
| 2017/0287109 A1 | 10/2017 | Tasfi |
| 2017/0287158 A1 | 10/2017 | Guo et al. |
| 2017/0300201 A1 | 10/2017 | Wigder |
| 2017/0300293 A1 | 10/2017 | Zhao et al. |
| 2017/0300457 A1 | 10/2017 | Wigder et al. |
| 2017/0308518 A1 | 10/2017 | Sjolander et al. |
| 2017/0310623 A1 | 10/2017 | Sjolander |

OTHER PUBLICATIONS

PCT International Search Report and Written Opinion of the International Searching Authority for PCT/US17/23036, dated Jul. 20, 2017, 13 pages.

* cited by examiner

ACCESSING CONTENT FROM SUPPRESSED URL INDEX

CROSS-REFERENCE TO RELATED APPLICATIONS

This application claims the benefit of and priority to U.S. Provisional Patent Application Ser. No. 62/310,811, filed on Mar. 21, 2016, entitled "LIST INDEX PRESENTATION SUPPRESSION SEARCH ENGINE," as well as U.S. Provisional Patent Application Ser. No. 62/384,499, filed on Sep. 7, 2016, entitled "LIST INDEX PRESENTATION SUPPRESSION," as well as U.S. Provisional Patent Application Ser. No. 62/409,736, filed on Oct. 18, 2016, entitled "DOUBLE NAVIGATION FOR LIST INDEX PRESENTATION SUPPRESSION AND PERSISTENCE," as well as U.S. Provisional Patent Application Ser. No. 62/432,989, filed on Dec. 12, 2016, entitled "MOBILE DOUBLE NAVIGATION FOR LIST INDEX PRESENTATION SUPPRESSION," as well as U.S. Provisional Patent Application Ser. No. 62/472,347, filed on Mar. 16, 2017, entitled "IN-MEMORY SUPPRESSION OF QUERY GENERATED INDEXES AND INTERFACES FOR NAVIGATING INDEXED CONTENT." The foregoing applications are incorporated herein by reference in their entireties.

BACKGROUND

Various systems and interfaces have been created for accessing and navigating content on the internet. For instance, when a user enters search terms into a browser interface, that browser will generate a search request that is sent to one or more search engines to identify indexed content corresponding with the search terms. When the browser receives search results back from the search engine(s), the browser will display the search results with controls for accessing and navigating through the search results.

Many browsers are distributed applications with interfaces that are configured to run on client machines and/or as services provided by remote hosts. Some browsers are also integrated into and hosted by the search engines. While other browsers are hosted by completely different domains than those that are hosting the search engines. Google, Bing and Yahoo are some non-limiting examples of search engines.

It is typical for search engines to utilize indexes that identify correlations between various search terms and the content that is available on different webpages. The indexes are formulated and updated in response to data obtained by web crawlers that identify and examine webpages. Each of the search engines utilize complex algorithms to weight the relevance between the search terms and the content identified in their indexes. Most search engines compile their search results into an ordered list, comprising a SERP (Search Engine Results Page). The SERP references different webpages containing content associated with the search terms. The browser presents the SERP, as a webpage to the user, with selectable links for each of the listed search result items. When a link is selected, the browser is redirected from the search engine domain to a different domain that is hosting the content corresponding to the selected link.

In some instances, the listing of content links identified in the SERP are sequenced in an order that is based on relevance, such as, for example, based on contextual correlations to the search terms provided by the browser and/or based on how recently the content was indexed and/or updated by the search engine web crawlers. The indexes for each search engine are formulated and updated in different ways. For instance, different search engines use different web crawlers at different times and they also use different algorithms for determining the significance or relevance between different terms. Accordingly, the results (e.g., SERP) returned by each of the different search engines will almost always be different. For instance, the SERP provided by one search engine might include references in a different order than the SERP provided by another search engine. Likewise, references in one SERP might be excluded from another SERP.

Some users are aware of the foregoing discrepancies and will sometimes go through the laborious process of interfacing with a plurality of different search engines to ensure that they are receiving the most appropriate content being searched for. This process, of interfacing with different search engines, however, is very time consuming and requires the user to navigate to the different domains of each search engine and to explicitly enter new user input for submitting separate requests to each of the search engines from those different webpages/domains.

Most browsers and search engines are configured to filter for and to distinguish between different types of content, such as image content, video content, shopping content, news content, general web content, etc. Accordingly, a user can select a particular content type filter on the browser interface to limit their search results to only the desired type(s) of content. However, the additional steps required for a user to filter their search to only a particular type of content, when comparing results from multiple search engines, can exacerbate the problems addressed above. In particular, the user will now need to perform the additional steps for navigating to and through the different filter menus/controls for each of the different search engines. This can be particularly problematic when the different search engines and browsers present their filter options differently, making it more difficult to navigate the content in a desired and consistent way. Each additional process and step required to perform this type of navigation will also incur additional computational expense and represents some of the technical difficulties associated with accessing content on the Internet.

In some instances, a user can navigate to a particular website by entering the URL of the website into the browser. Once the browser navigates to the domain of that website, it will present content published by the host website, as well as links to secondary content published by the host website and/or secondary websites hosted by different domains. For instance, a host website might include links associated with a plurality of different articles published by the host. In these instances, when a user clicks on a link, the browser will access the corresponding content, which is often provided from the same host domain. In other instances, the link may redirect the browser to another domain that contains the webpage for the linked content. If a user wants to read/access all of the different linked content (particularly when it is hosted by different domains), they will be required to iteratively navigate back to the host domain website before they can access the different links to the different websites hosted by different domains. Even when the websites are all hosted by the same domain host, the back and forth navigation to the primary webpage represents wasted time and computational processing.

In some instances, a webpage may be configured to wrap the secondary linked content hosted by the secondary domain(s) into the webpage frame of a first domain, without requiring a user to navigate to the secondary domain(s). This can be accomplished, for example, by having the webpage of the first domain query for the content of the secondary domain(s) so that it is surfaced by the first domain within the frame of the first domain. However, such processing may result in undesired filtering of content and services provided by the second domain. This can also prevent the user's profile from being accurately updated to reflect navigation to the secondary domain(s) and/or while providing unnecessary attribution to the first domain.

Problems associated with navigating content on the internet can be even more pronounced on mobile devices because some of the browser navigation controls are restricted, including the presentation of links to secondary content, adding to the difficulty for making the back and forth navigation between the primary webpage or SERP and the different linked sources. This is particularly true when the secondary links redirect the browser to different domains.

SUMMARY

Disclosed embodiments include systems, methods and devices for generating, suppressing and utilizing indexes for navigating content, as well as for interfaces that are configured with unique features and controls facilitating content navigation.

Systems, methods and devices are provided for generating and suppressing indexes that are utilized for navigating content. After a search query is processed, search results are received. These search results comprise a URL listing, or other webpage listing, identified in the search results. Then, prior to and without rendering the particular URL/webpage listing, a particular webpage is identified from the search results. The system initiates a request for the particular webpage prior to rendering the URL/webpage listing. That URL/webpage is then accessed and displayed automatically, while providing a one input link to the URL/webpage listing, and sometimes without or at least prior to displaying the URL/webpage listing.

Many of the foregoing embodiments and others described herein can be used to help facilitate the manner in which a user accesses and navigates content on the internet. These embodiments can be particularly helpful when navigating content provided by disparate search engines and/or other host domains, as well as when navigating content on a mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
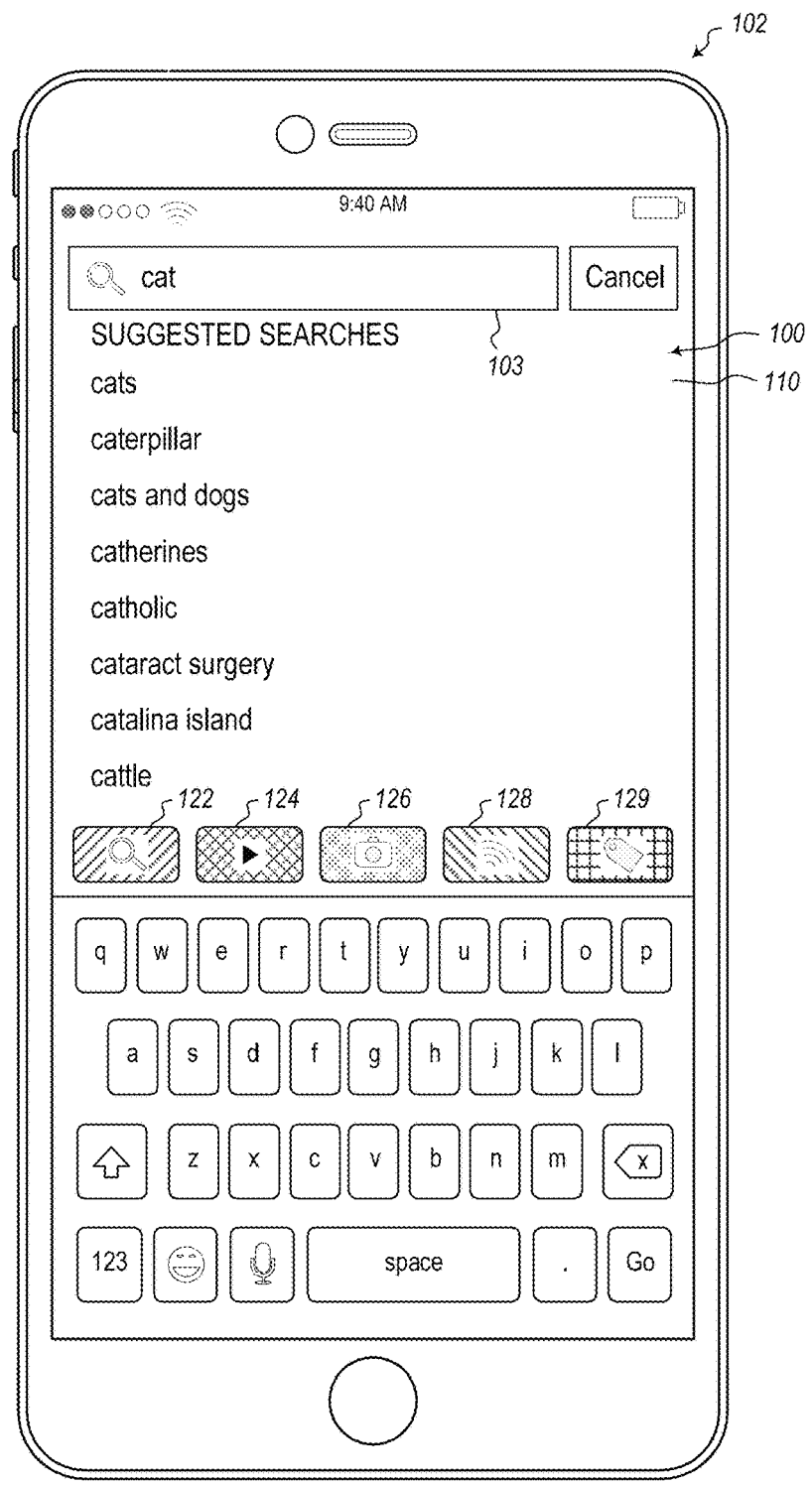
FIG. 1 illustrates an example of a browser interface on a mobile device in which a search field and plurality of pivot icons are displayed that correspond to different content types, including a general search pivot icon, a video pivot icon, an image pivot icon, a news pivot icon and a shopping pivot icon.

The disclosed embodiments include systems, methods and devices for generating, suppressing and utilizing indexes for obtaining and navigating content, as well as for interfaces that are configured with unique features and controls for facilitating navigation of the content.

Some of the disclosed embodiments include the generation and suppression of indexes derived from SERP structures. The derived indexes are actively used to facilitate navigation of content referenced in the SERP structures, rather than utilizing the SERP structures directly. In some instances, a SERP is temporarily or selectively hidden from view, while presenting and navigating content referenced by the SERP. In some instances, a user is enabled to navigate to the SERP from another webpage that was linked in the SERP and that was displayed by the browser prior to the SERP ever being displayed by the browser.

In some instances, the suppressed indexes are built off of sitemap files identified in web crawler protocol files for particular webpages. Selectable icons are provided for modifying a mode of browsing and for directly accessing content linked in the particular webpages, without having to select the links from the particular webpages directly.

Some disclosed embodiments also provide unique pivot icons for facilitating direct navigation links between different sets of search results from different search engines and/or host domains, corresponding to search input entered by the user a single time at the browser, and without requiring the user to navigate to and enter the same search input at the different search engine interfaces to perform similar searches directly with each of the different search engines.

Some embodiments also provide a navigation control with links to webpages identified in suppressed indexes and which is displayed concurrently with content corresponding to one or more of the webpages. The navigation control is modified to reflect navigation between different linked webpages.

The disclosed embodiments are useful, in some instances, to reduce technical difficulties associated with navigating content with a browser, particularly content provided by disparate host domains and search engines. Some of the improvements include reductions in the amount of steps and processes that must occur to navigate the content and to filter out content that could be harmful. The disclosed embodiments can also facilitate improvements with navigating content on small screen and mobile devices, particularly touch screen devices, which sometimes limit browser control functionality.

In short, this disclosure helps to highlight some of the problems and deficiencies associated with existing internet navigation technologies and technical solutions for improving the efficiency and ease for performing internet navigation with a browser that interfaces with one or more search engine.

Attention will now be directed to FIGS. 1-23, 26 and 33 which illustrate various interfaces, systems and structures that are incorporated by or utilized in the claimed embodiments. Then, a description of various methods for implementing claimed embodiments will be provided in reference to the flow diagrams illustrated in FIGS. 24 and 27-32.

FIG. 1 illustrates an example of a browser interface 100 on a mobile device 102 in which a search field 103 and plurality of pivot icons are displayed that correspond to different content types, including a general search pivot icon 122, a video pivot icon 124, an image pivot icon 126, a news pivot icon 128 and a shopping pivot icon 129. Each of the different pivot icons correspond to a different type of content that can be searched for. In this regard, each of the different pivot icons represent a filter, which, when selected causes a search request to be formulated by the browser to search one or more search engines, designated by the browser, for content associated with that filter/content type. By way of example, after the user types the word cat into the search field, and before hitting submit or enter, the user can simply select the filter type or pivot icon corresponding to the type of content they want to see for the search term cat. The selection of the pivot icon will trigger the formulation of a search request for that corresponding type of content. Even more particularly, if a user selects the general search pivot icon 122, the browser will formulate a search request for content associated with cats (without restriction to a focused content type). That search will be sent to one or more search engines that are configured to provide results corresponding to the selected content type.

Alternatively, if the user were to select the video pivot icon 124, the browser would formulate a search for video content corresponding to cats or other terms in the search field 103, which would be sent to one or more predetermined search engines that are configured to obtain and filter search results corresponding to the requested content type (e.g., videos). Likewise, selection of the image pivot icon 126 will cause the browser to formulate a search for image content associated with cats or any other terms in the search field 103. Selection of the news pivot icon 128 will cause the browser to search for news content associated with cats or other term in the search field 103. Finally, selection of the shopping pivot icon 129 will cause the browser to formulate a search for content presenting items for sale or other shopping sites associated with cats or any other terms in the search field 103.

Once a search is formulated by the browser, it will be sent to a predetermined default search engine. Alternatively, in some embodiments, the search will be sent to multiple different search engines (e.g., Google, Bing, Yahoo, Giphy, YouTube, Amazon, Ebay, etc.). In this regard, it will be appreciated that the term search engine corresponds to any computing system or internet domain that is configured to receive a search request from a browser for one or more URLs (corresponding to a specified address in the request and/or one or more search terms identified in the request) and to identify and return a listing to the browser of one or more relevant URLs for websites containing relevant content related to the search request. In some embodiments, the search results returned from a search engine are composed in the form of a SERP (Search Engine Results Page), which may comprise a webpage and/or instructions for rendering the URLs identified in the SERP. The search results identified in the SERP or other result listing will typically include URLs that are presented by the browser as links to the corresponding websites referenced by the URLs.

In some embodiments, the SERP or other indexed listing that is returned as the search results will not displayed to the user, as is typically the case for existing browsers. Instead, the SERP or other indexed URL listing is used to derive a new index that is suppressed in memory and that is used as the basis for navigating the content identified in the SERP. In some instances, the derived index excludes one or more references identified in the SERP, such that the derived/suppressed index comprises a subset of the URLs identified in the SERP (or other search result index).

Details associated with the derived index will be provided below, following a more detailed description of the techniques and embodiments associated with obtaining and navigating the search results with the pivot icons and other browser controls.

Figure 2:
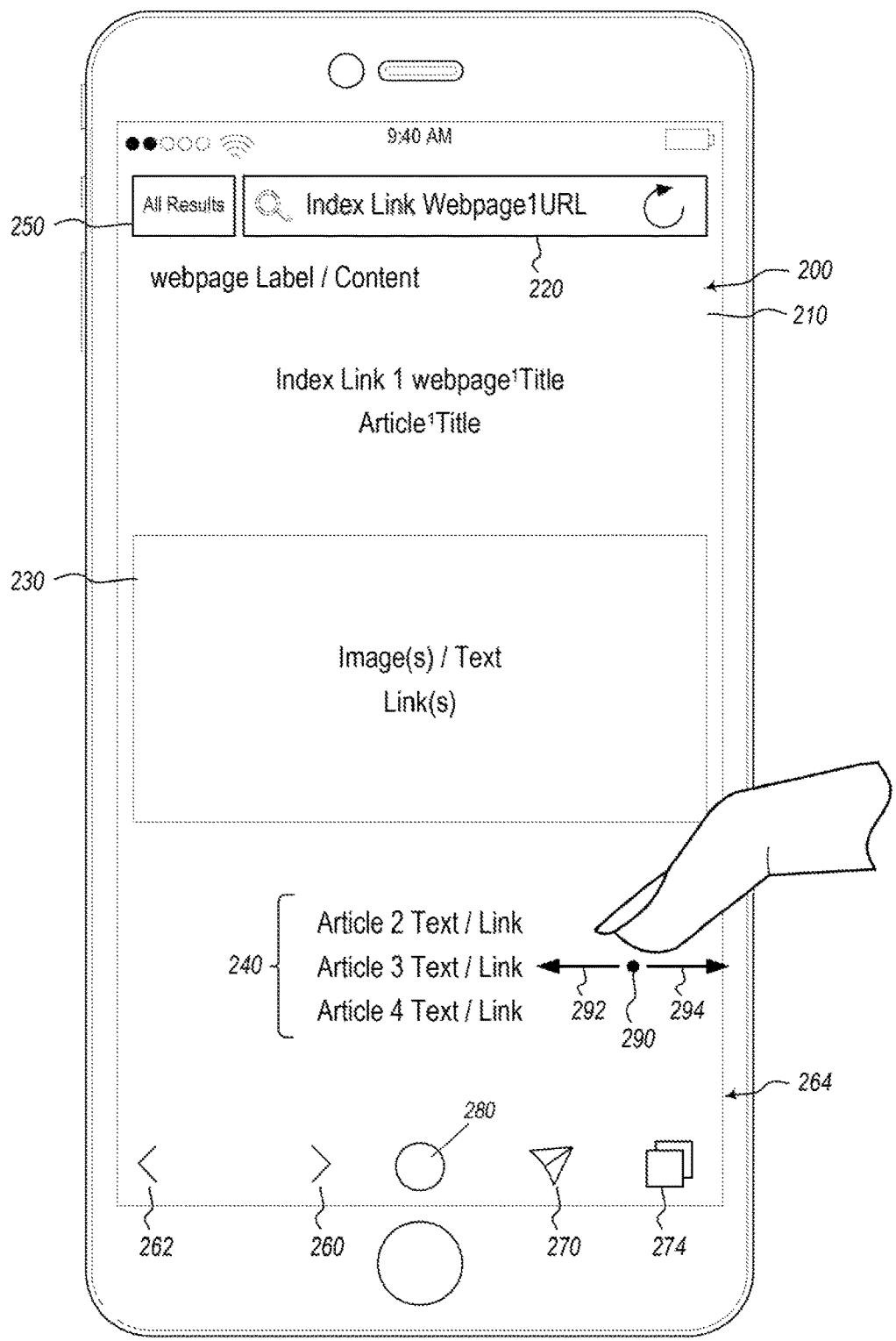
FIG. 2 illustrates an example of a browser interface corresponding to the browser interface of FIG. 1, in which a webpage is displayed in response to user input entered in the search field and/or in response to a user selecting a suggested search term.

FIG. 2 illustrates an example of a browser interface 200 corresponding to the browser interface 100 of FIG. 1, in which a webpage 210 is displayed in response to user input entered in the search field and/or in response to a user selecting a suggested search term from the interface 100 of FIG. 1. The webpage 210 can also be accessed by typing the URL into the URL field 220.

As shown, the webpage 210 includes one or more titles, images and text. The webpage 210 is shown in abstract form, inasmuch as the makeup of the webpage will vary according to the types of content that are presented and the formats that are defined by the webpage. In this webpage 210, as in many typical webpages, the content of the webpage will include links to other webpages. In this instance, the image(s)/text 230 of the webpage comprise links (such as to explore more details about the content). Likewise, there are several articles (article 2, article 3 and article 4) that also comprise links to the referenced articles. When any of these links are selected, the browser will access and display the linked content. In some instances, the linked content is hosted by the same domain as the domain hosting the current webpage 210. In other instances, the linked content is hosted by a different domain and will cause the browser to leave the current domain and to access the new domain in order to access the linked content.

In this embodiment, the user typed cat into the search field 103 of webpage 103 in FIG. 1. The user also hit enter, submit or another button for triggering the search. This in turn, caused the browser to submit a search to one or more predetermined search engines for URLs associated with content about cats. When the results come back, in the form of a SERP structure or another index of URLs, the browser creates a derived index of the URLs and suppresses the derived index. The browser also automatically accesses the first listed URL in the derived index, without and prior to displaying the SERP. In this instance, the first listed URL in the derived index links to the webpage 210 shown in FIG. 2. In some instances, this may also be the first listed webpage in the SERP. In other instances, the first listed webpage in the SERP is excluded from the suppressed index and is not accessed/displayed.

In some instances, the browser provides controls for helping the user identify and navigate the content. For instance, the user is presented a content type icon 250 that identifies the scope/filter used to perform the search. In this instance, the type/filter identifies that 'all results' are included, meaning that the content is not focused on a type that is more exclusive (e.g., video, image, shopping, news, etc.).

The user is also provided navigation controls that provide a single input link to other webpage results and/or the SERP. In this embodiment, a forward control 260 and a backward control 262 are provided for accessing a next or previous webpage identified in the suppressed index. If there is no previous webpage identified in the suppressed index when the backward control 262 is selected, the browser will display the SERP (which effectively acts as the first webpage in such instances). The SERP may actually be linked and listed, in some instances, as the first entry in the suppressed index that is referenced by the browser when the browser receives a forward or backward navigation command.

The forward and backward navigation commands can also be triggered by the user entering a swipe gesture at any point on the touch screen display 264. For example, the user might touch the screen 264 at point 290 while swiping left (illustrated by arrow 292) or swiping right (illustrated by arrow 294). A swipe gesture of this type will register a forward or backward command with the browser, similar to how selection of links 262 and 264 will trigger navigation through referenced URLs (and the SERP) from the suppressed index.

A control 270 is also provided, when selected, to trigger an interface for sending the webpage 210. For instance, when a user selects control 270, the user is prompted to identify another entity address or name where the displayed webpage or corresponding URL will be sent. The browser then interfaces with the social media platform associated with that entity address (e.g., Outlook, messenger, etc.) to send a message that includes the webpage and/or URL.

Control 274, when selected, triggers the browser to generate a new browser instance. In some embodiments, the new instance is a new browser tab within a same browser window that was displaying the webpage when the control 274 was selected. In other instances, the new browser instance is a new browser window, which contains the one or more tabs.

A pivot access icon/control 280 is also provided which, when selected, causes the browser to display the different pivot icons describe in reference to FIG. 1 (e.g., pivot icons 122, 124, 126, 128 and 129). The presentation of the pivot icons can occur with the display of the webpage (in some instances) and/or in an independent interface display (see FIG. 19).

In some instances, the coloring of the pivot access control 280 is modified to correspond with a coloring of the content type icon 250 that is currently selected/active for the corresponding search results that are being displayed. In this regard, different pivot icons will have different coloring to create an association between the content type and the color of the pivot icons. Different coloring/shading schemes can be used to accommodate different needs and preferences. However, in some embodiments, the general search pivot icon is colored blue, the video pivot icon is colored red, the images pivot icon is colored yellow, the news pivot icon is colored purple and the shopping pivot icon is colored green.

In some embodiments, the configuration of the pivot icons within the display can also be modified in such a way as to list the most commonly selected/used pivot icons before less frequently selected/used pivot icons. The size of the pivot icons can also vary, to represent (with larger sizes) the pivot icons that are utilized more frequently. The system will, in some instances, track the use of the different pivot icons and store this information for reference when considering how to present the different pivot icons when an input is received for triggering a display of the pivot icons.

Other types of user input can also be used for triggering a display of the pivot icons. For instance, in some embodiments, the content type icon 250 is selectable to trigger a display of the pivot icons. Detection of input being typed into the URL field 220 or a search field (if present) can also trigger the display of the pivot icons.

Figure 3:
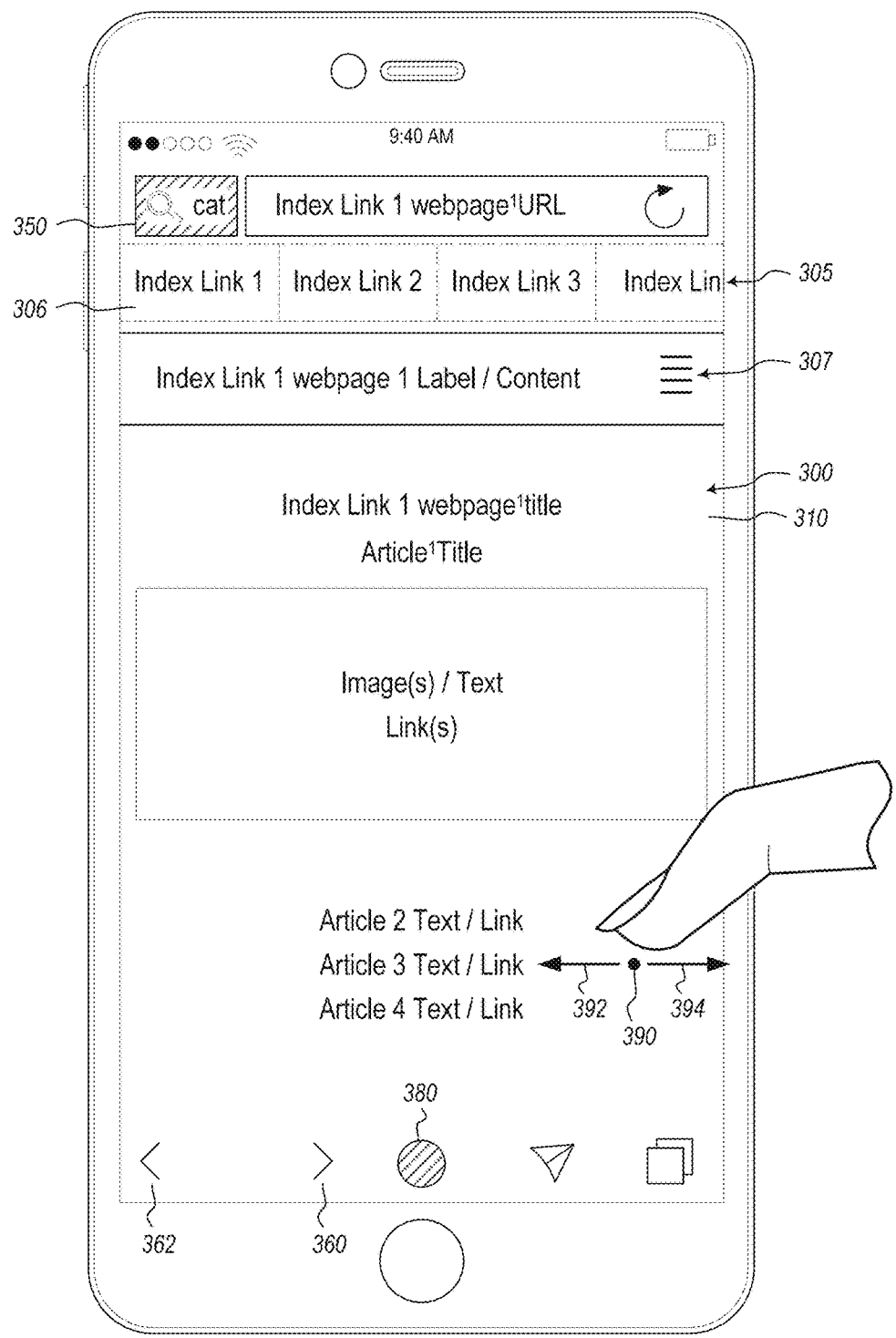
FIG. 3 illustrates an example of a browser interface corresponding to the browser interface of FIG. 1, in which a webpage is displayed in response to user input entered in the search field and also in response to a selection of the general search pivot icon and in which a navigation control panel listing webpage links associated with a suppressed index.

Attention is now directed to FIG. 3, which illustrates an example of a browser interface 300 showing a webpage 310 that is similar to the webpage 210 of FIG. 2. However, in this embodiment, the interface 300 is configured with a navigation control panel 305 that lists a plurality of webpage links to webpages that are identified by the suppressed index associated with the SERP. Notably, the links are sorted into a sequence/order that is defined by the suppressed index and which may be different than the sequence/order of URL links identified in the SERP, and which may omit one or more URL links that were included in the SERP listing, as described in more detail below with reference to FIG. 26.

When a link in the navigation control panel is selected, the browser will access and display the webpage associated with the selected link. In some instances, this requires the browser to access and display content from a different domain.

In some instances, the positioning of the links in the navigation control panel 305 conveys information to the user regarding the webpage that is being displayed. For instance, the left justified position of the Index Link 1 306 indicates that the webpage 310 corresponds to that link. When a new link is selected, that new link will be repositioned in the left justified position. In other embodiments, a central or right justification is used instead, to reflect the selected link and displayed webpage. Other modifications to the navigation control panel 305 can also be used to reflect the current/relevant link. For instance, highlighting and font changes can be used to emphasize the current/selected link. Other links can also be de-emphasized to, by reference, emphasize the selected/current link.

To accommodate the positioning of the navigation control panel 305, the webpage 310 may be formatted or reformatted in such a way as to accommodate the lost space given to the navigation control panel 305. Accordingly, the website 310 may collapse one or more webpage elements into a menu 307. Alternatively, other browser interface elements can be collapsed into a menu 307 that is displayed with the webpage.

A user can navigate to the different linked content (identified by the navigation control panel 305) by directly selecting links from the navigation control panel 305. Other single input navigation techniques can also be used, such as a selection of control 360 or 362, or the submission of a swipe gesture entered at the touch screen of the device. A user can enter a swipe gesture at point 390 (or another point) by moving their finger left (as illustrated by arrow 392) or right (as illustrated by arrow 394).

Figure 5:
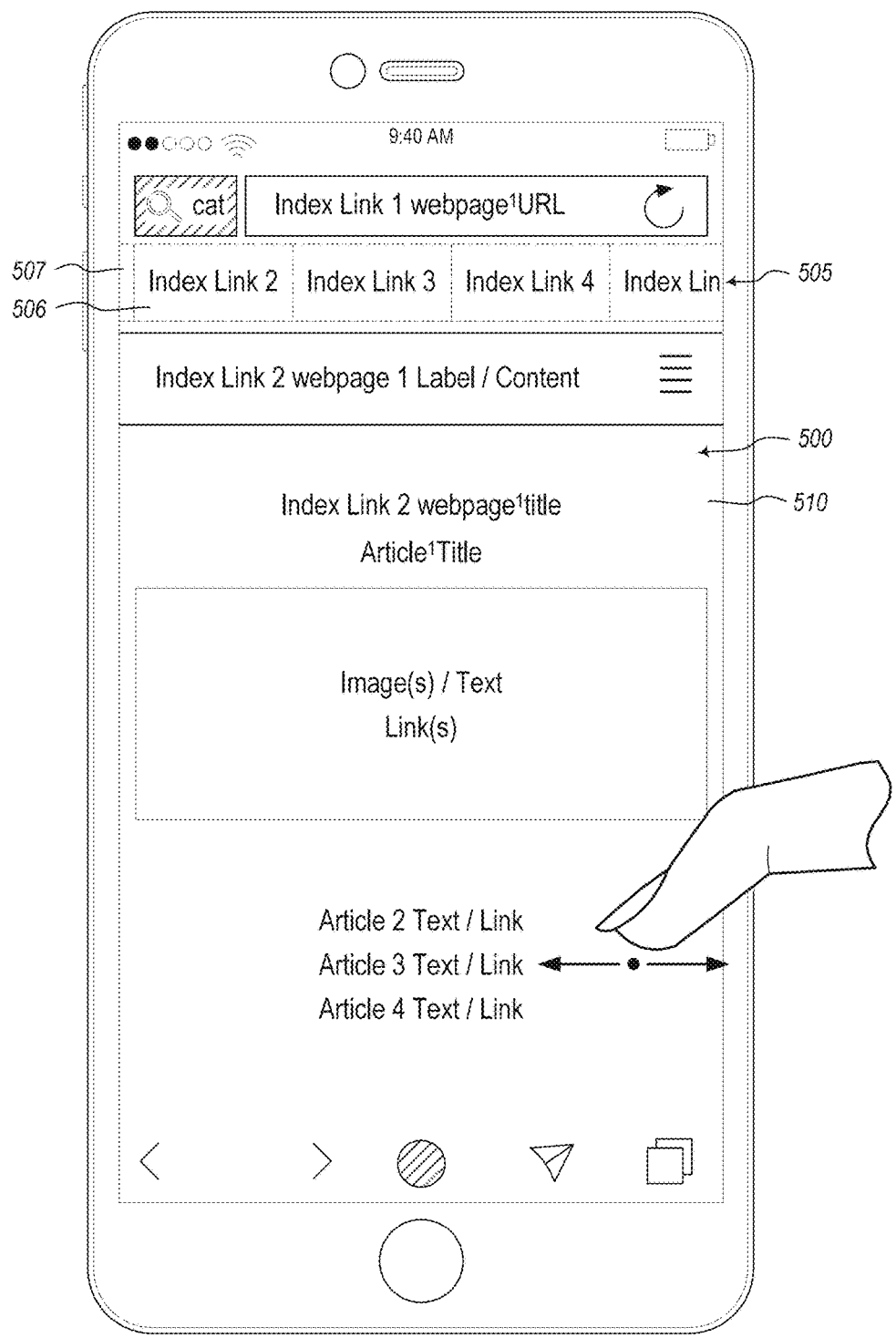
FIG. 5 illustrates an example of a browser interface similar to the browser interface of FIG. 4, in which the navigation control panel and the displayed webpage have been updated in response to user navigation to a second webpage link identified in the navigation control panel.

When the user navigates right (with a gesture or control selection), they will be directed to the next listed webpage link in the navigation control panel 305, based on referencing the suppressed index to identify the next listed webpage link, (in this case to index link 2, corresponding to the webpage shown in FIG. 5). Alternatively, when the user navigates left, they will be directed to the previously listed webpage link in the navigation control panel 305, based on referencing the sequence defined in the suppressed index. Currently, however, there is no previously listed webpage link, in as much as index link 1 (306) is the first listed webpage link in the navigation control panel. In this instance, the browser will display the SERP (which may be the first listed webpage link in the suppressed index or not).

Navigation input will, in some instances, cause the browser to initiate a query for the corresponding webpage to be displayed, based on the sequencing order in the suppressed index and based on stored index data. For instance, the index may store the URL of the different listed webpages, such that in response to detecting navigation input (e.g., a request for a next or previous page), the browser will identify the URL of the next or previous page from the suppressed index and will, responsively, send a request to the appropriate host/domain for the webpage. In some instances, the request is sent to an intermediary server/service that has cached or that will access the webpage and send the webpage to the browser for display on-demand.

In other embodiments, the system pre-fetches and caches a predetermined number of webpages referenced in the suppressed index before and/or after the webpage that is being displayed, even before receiving navigation input from the user and/or at the browser. Then, when a request is made for the next/previous webpage, the browser simply accessed the cached webpage from the system memory/cache.

Figure 4:
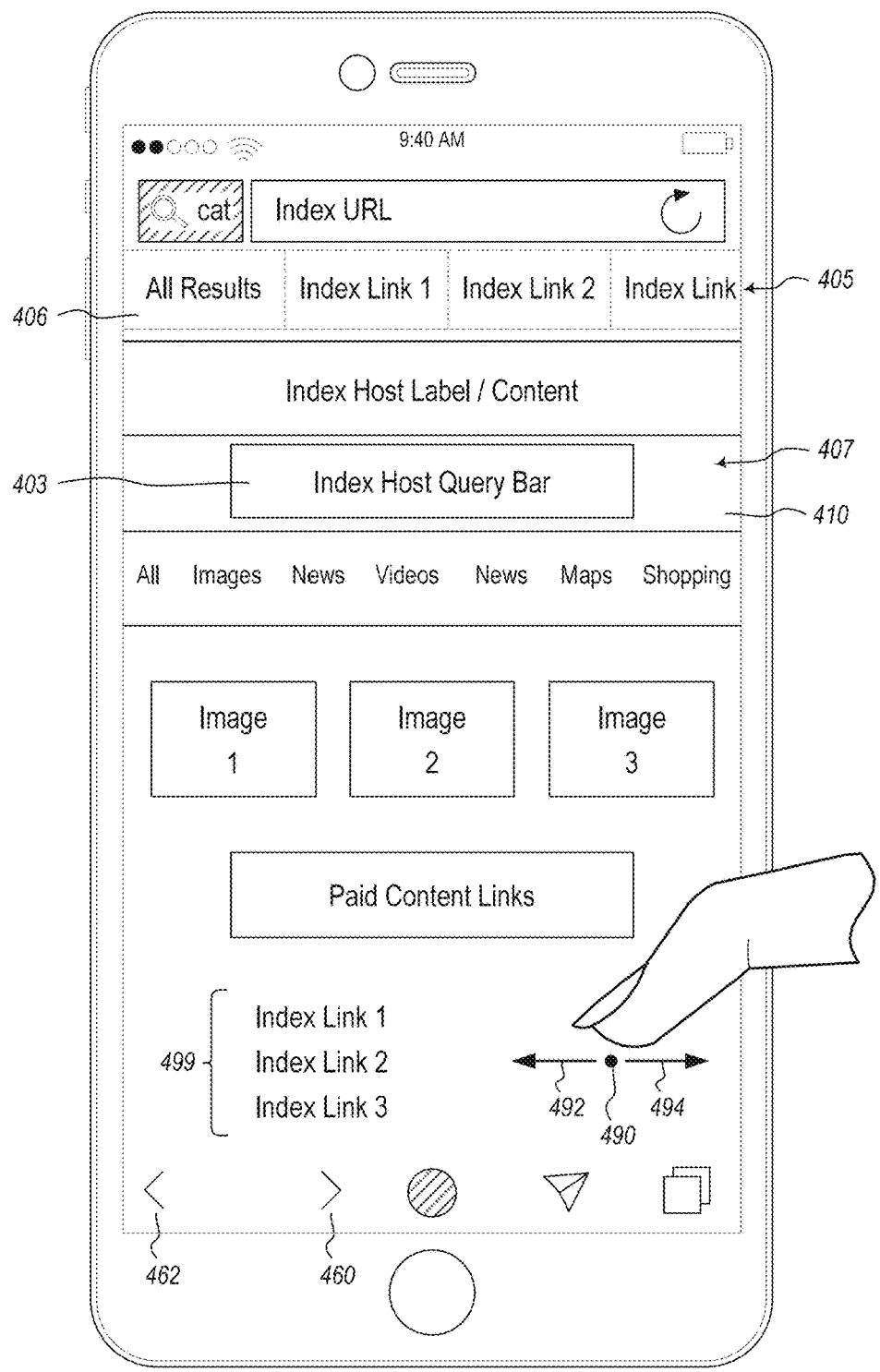
FIG. 4 illustrates an example of a browser interface similar to the browser interface of FIG. 3, in which the navigation control panel has been updated with a link to the SERP and the SERP is displayed in response to user navigation to the SERP.

FIG. 4 illustrates a SERP webpage that might be accessed and displayed in response to a left navigation input when a first listed webpage in the suppressed index (other than the SERP) is currently being displayed. For instance, the browser will replace the display of the webpage 310 (FIG. 3) with a display of the SERP when a gesture corresponding to arrow 392 is received and/or when control 362 is selected. One or more dedicated control icons (not presently shown) can also be displayed for directly linking to the SERP.

As shown in FIG. 4, the displayed webpage 410 is a general SERP webpage. The navigation control panel 405 has also been updated to reflect that the 'All Results' link that is associated with the displayed webpage 410 is being displayed. In this embodiment, the displayed webpage 410 is a standard SERP webpage that might typically be returned from a search engine, with links 499 to one or more webpages. Notably, this webpage 410 was not displayed until after one of the linked webpages (e.g., Index Link 1) identified in the SERP was previously displayed.

The webpage 410 also includes a query bar provided by the search engine host. When a user types input into the query bar, the browser intercepts this input and triggers a display of the pivot icons described above with reference to FIG. 1, for helping to modify the search request being sent to the search engine(s).

Attention will now be directed to FIG. 5. FIG. 5 illustrates an example of a browser interface 500 similar to the browser interface 400 of FIG. 4, in which the navigation control panel 505 and the displayed webpage 510 have been updated in response to user navigation to a second webpage link identified in the navigation control panel 505, namely Index Link 2 506. Navigation to this linked webpage could occur from selecting the link 560 directly from the navigation control panel 505 or by selecting control 460, for example.

Figure 6:
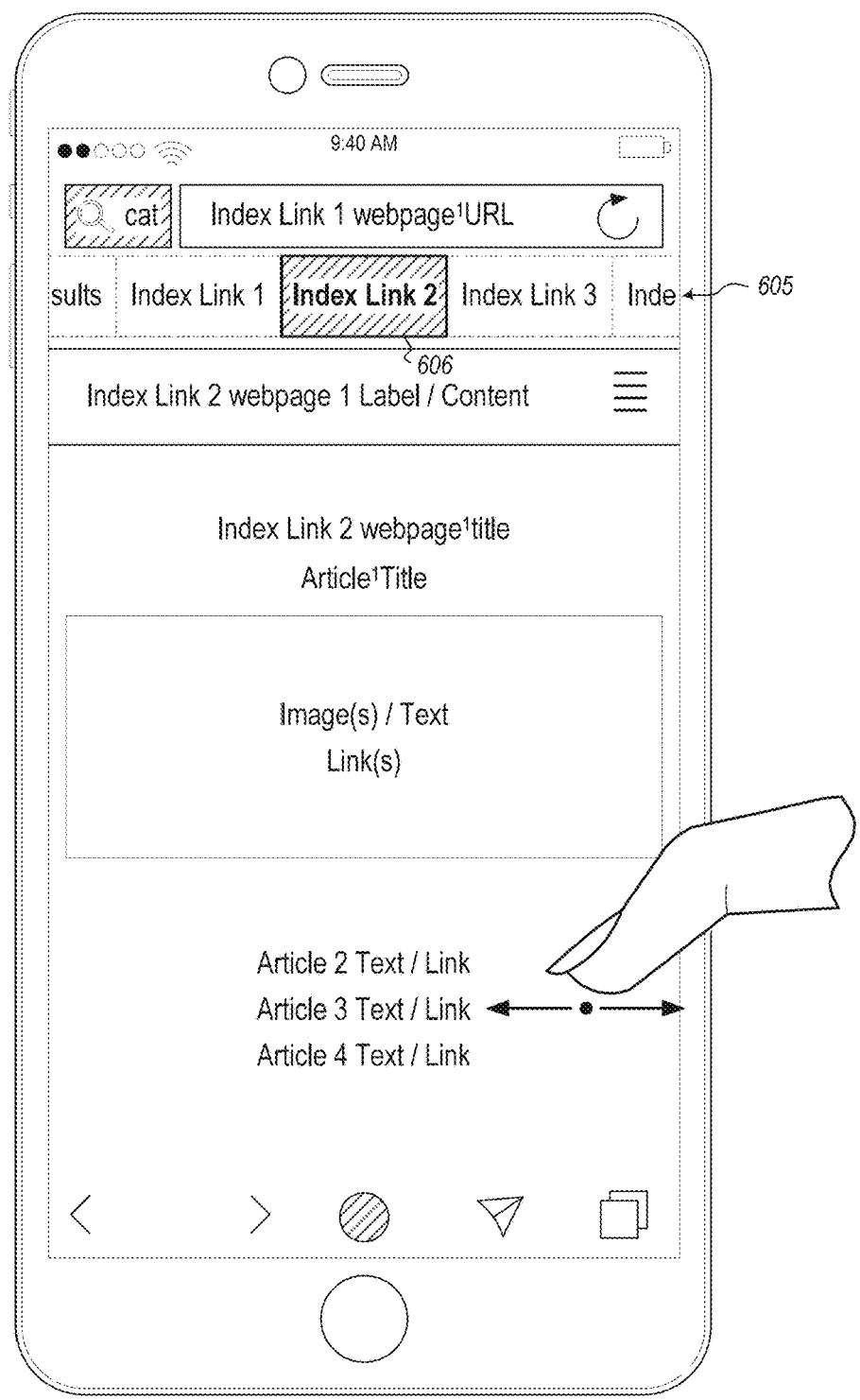
FIG. 6 illustrates an example of a browser interface similar to the browser interface of FIG. 5, in which the navigation control panel is updated to emphasize a webpage link corresponding to the displayed webpage in the navigation control panel.

As shown, the link 506 to the displayed webpage 510 is mostly left justified in the navigation control panel 505, to emphasize that this is the link corresponding to the displayed webpage 510. However, as described earlier, the link 506 can also be emphasized in different ways, such as shown in FIG. 6, by centering and/or by changing a shading, coloring, font, size, or highlighting of the link 606. In the present embodiment, the navigation control panel 505 also shows a portion of another link 507 to the left of the index link 2 (506), indicating that there is a link to be navigated to, if desired. In other embodiments, the links to the left of a selected link are not visible (including the SERP link, for example).

Figure 7:
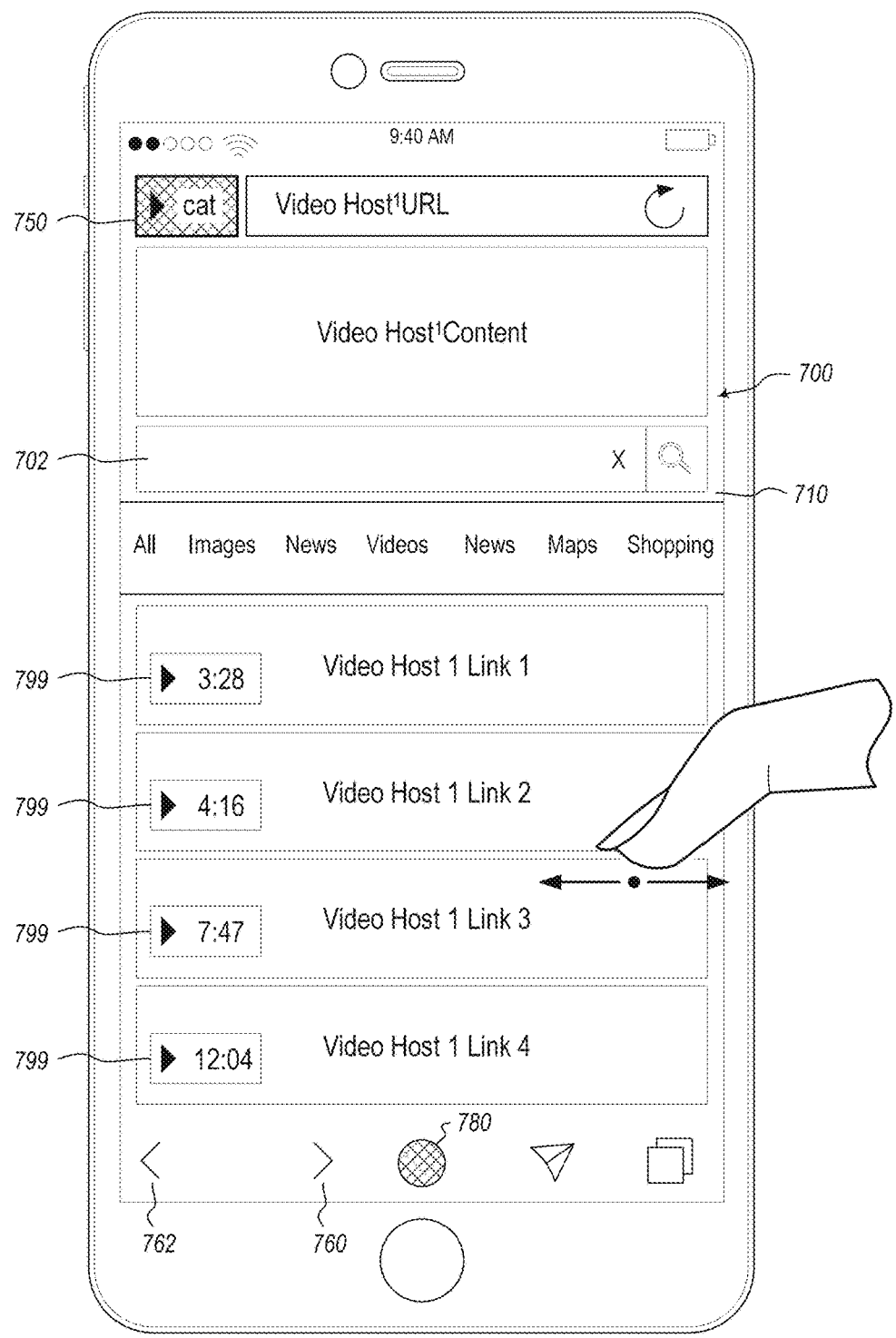
FIG. 7 illustrates an example of a browser interface corresponding to the browser interface of FIG. 1, in which a webpage is displayed in response to user input entered in the search field and also in response to a selection of the video pivot icon.

FIG. 7 illustrates an example of a browser interface 700 corresponding to the browser interface 100 of FIG. 1, in which a webpage 710 is displayed in response to user input entered in the search field 110 and also in response to a selection of the video pivot icon 124 of FIG. 1.

Accordingly, the browser performed a search with one or more search engine(s) for video content. When the content type is a specialized or focused type (such as video, image, shopping, etc.) the browser will obtain multiple different search results from different search engines specializing in providing content of that type. For instance, the browser, in response to a request for video content will perform a search with Bing, Google, Yahoo, Youtube, and other video domains to identify URLs matching the terms submitted with the search. The search engine domains for each particular content type are predefined by the browser settings and can be modified in response to user input.

The search results from each of the search engines can include a SERP or other URL index. In these instances, the browser creates a corresponding suppressed/parsed index that is used for navigating the content. This suppressed index is also used to identify the links that are presented in the navigation control panel, as described earlier. However, rather than only listing particular webpages identified in a single SERP/index, this type of filtered search to multiple search engines will result in the browser obtaining search results (SERPs) from multiple search engines. When multiple different search engine results are received, the suppressed index will be built with multiple different entries in the suppressed index for the different SERP webpages (corresponding to the different search engines), such as with a link to the Google video SERP, a link to a YouTube SERP, a link to a Bing video SERP, and links to other specialized search engine SERPs or general/filtered search engine SERPs etc.

The navigation control panel (if displayed) will then show links for these different webpages (some of which may be SERPS or other search engine index pages). When one of those links is selected, or other navigation input is received, the browser will reference the suppressed index to identify, access and display the linked content, which in some instances includes a SERP or other search engine index filtered for the particular type of content that was searched.

In the present embodiment, since the video pivot icon was selected for filtering search results to video content, the content type icon 750 has been updated to reflect the coloring/type associated with the selected pivot icon. The pivot access icon 780 has also been updated accordingly, with the same coloring and/or icon objects/labels.

The webpage 710 that is shown is currently a webpage SERP for video content, including multiple links 799 to video content available from a particular host search engine.

A user can navigate to other webpages referenced in the suppressed index, such as other search engine SERPs for video content, by providing a gesture (as previously discussed) or by selecting one of the navigation controls 760, 762.

Figure 8:
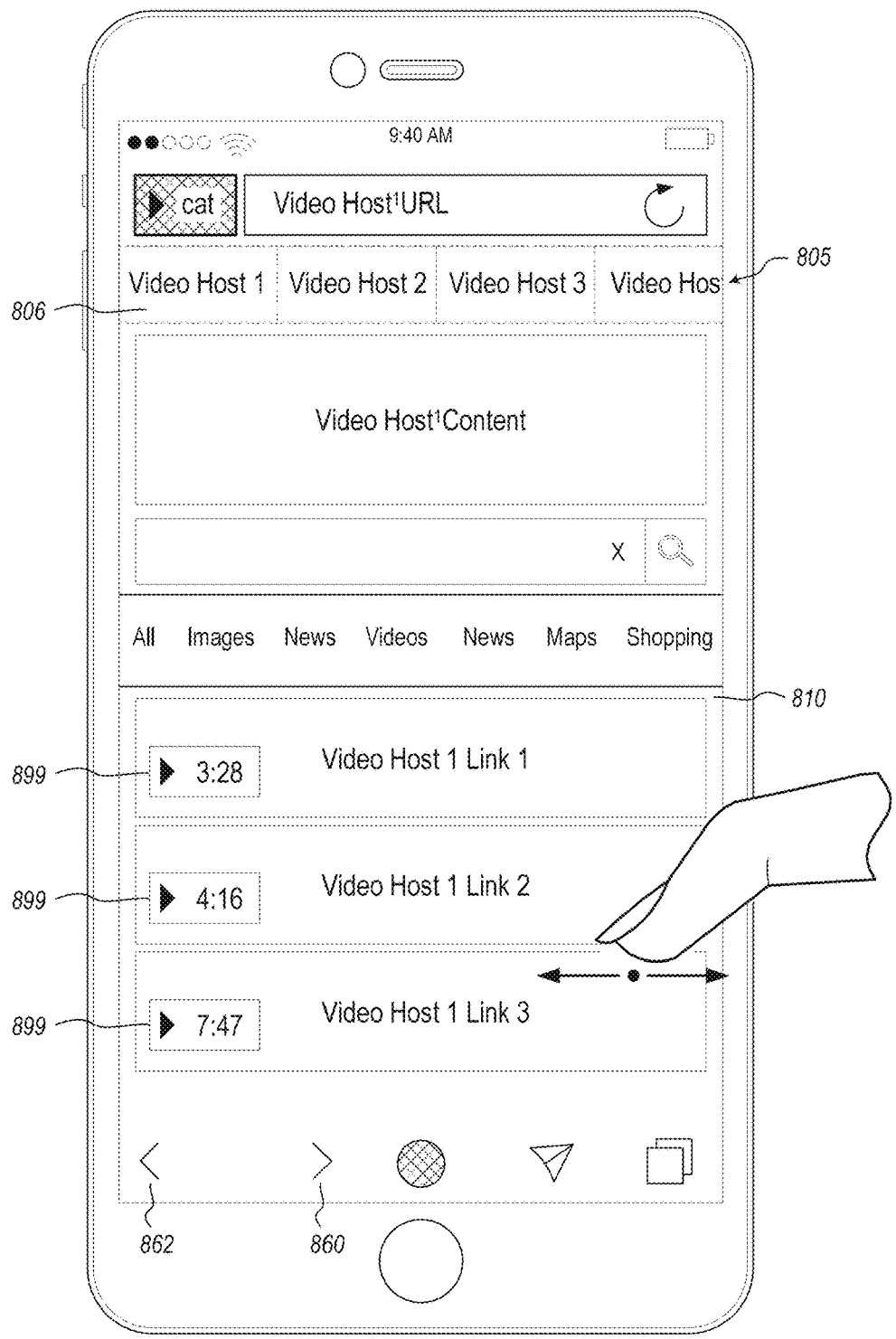
FIG. 8 illustrates an example of a browser interface corresponding to the browser interface of FIG. 7, in which the webpage is displayed with a navigation control panel listing webpage links associated with a suppressed index.

FIG. 8 illustrates a similar browser interface to the interface of FIG. 7. However, in this embodiment, navigation control panel 805 is displayed and the webpage 810 has been updated to accommodate the space requirements needed for the navigation control panel 805. For instance, one of the links 799 has been dropped from the listing of links 899. However, a user can scroll down to view the omitted link as well as other related links. As shown, the video host 1 link 806 is also left justified to reflect the webpage 810 that is being displayed. The user can then navigate to the results from another search engine (for similar video links) by selecting the link for that search engine from the navigation control panel 805 and/or by entering a swipe gesture or selection of control 860 or 862.

Figure 9:
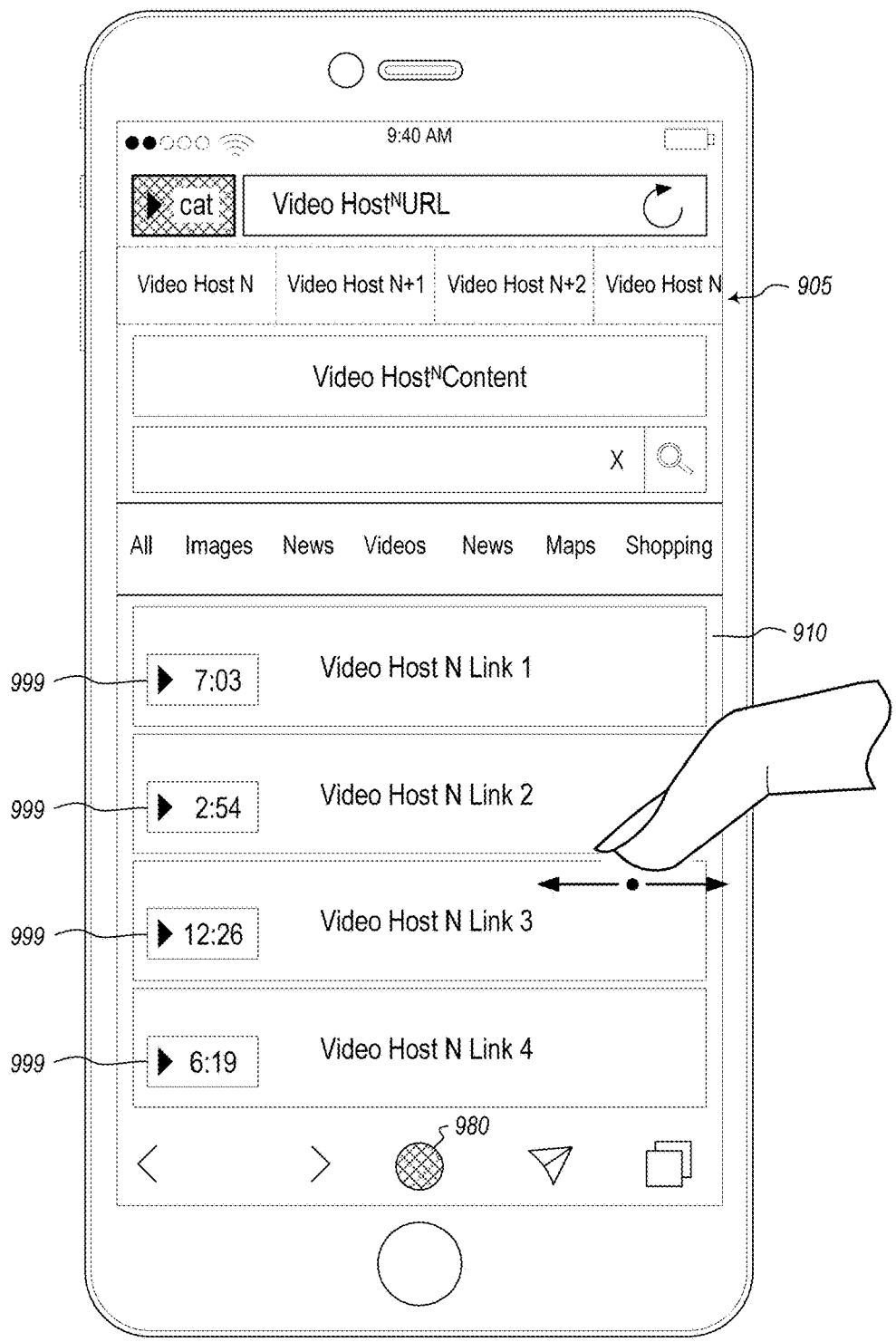
FIG. 9 illustrates an example of a browser interface similar to the browser interface of FIG. 8, in which the navigation control panel and the displayed webpage have been updated in response to user navigation to a different webpage link identified in the navigation control panel.

FIG. 9 illustrates another example of a browser interface similar to the browser interface of FIG. 8, in which the navigation control panel 905 and the displayed webpage 910 have been updated in response to user navigation to a different webpage link identified in the navigation control panel, namely, video host N (wherein video host N could be video host 2, 3, 4, etc.) or any other webpage identified in the suppressed index and which the user has navigated to, utilizing any of the navigation techniques and/or controls described herein.

Figure 10:
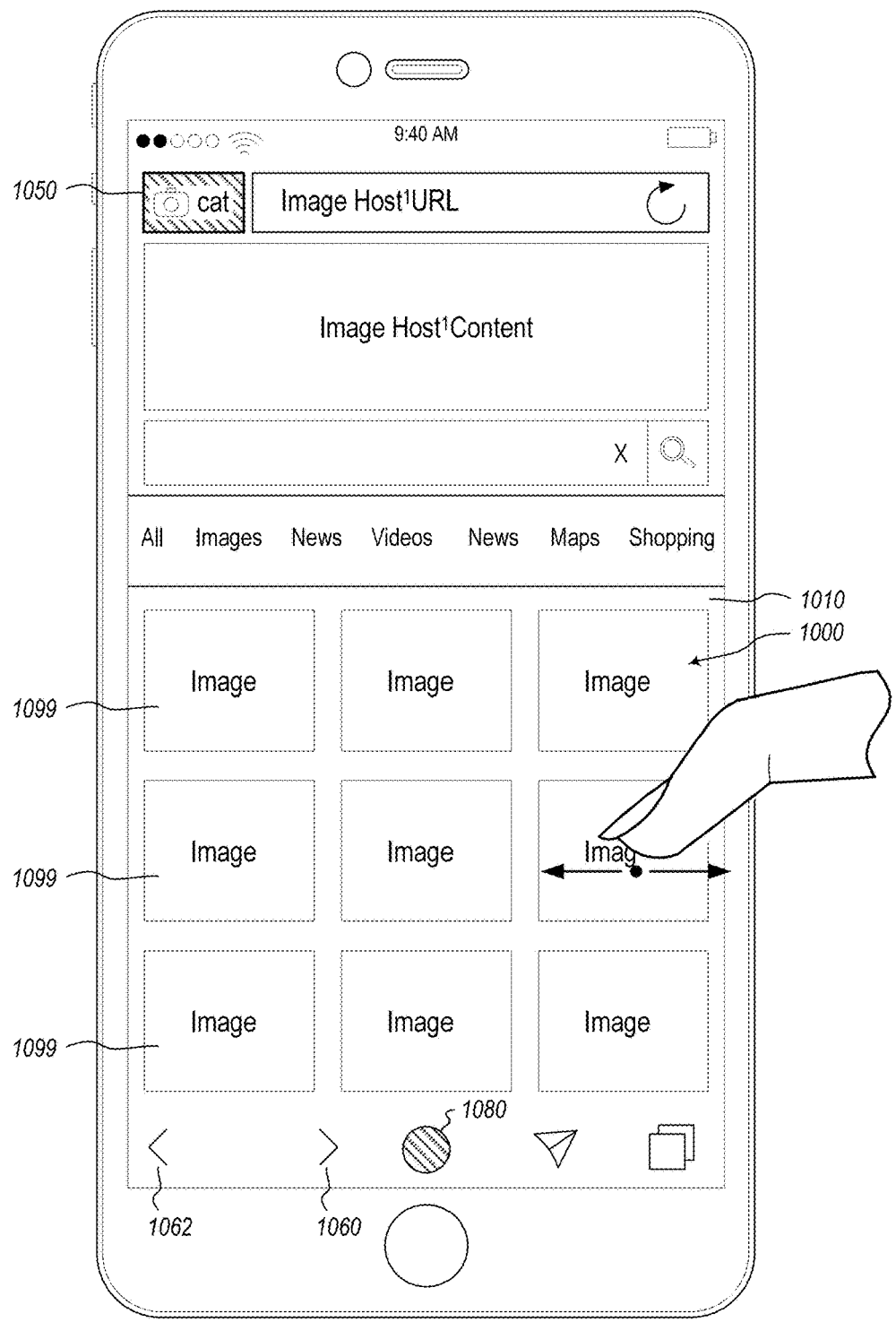
FIG. 10 illustrates an example of a browser interface corresponding to the browser interface of FIG. 1, in which a webpage is displayed in response to user input entered in the search field and also in response to a selection of the image pivot icon.

FIG. 10 illustrates an example of a browser interface 1000 corresponding to the browser interface 100 of FIG. 1, in which a webpage 1010 is displayed in response to user input entered in the search field 110 and also in response to a selection of the image pivot icon 126 of FIG. 1.

Accordingly, the browser performed a search with one or more search engine(s) for image content. As discussed above, with regard to the video content search, the browser obtains multiple different search results from different search engines specializing in providing content of the content type corresponding to the selected pivot icon. For instance, the browser, in response to a request for image content will perform a search with Bing, Google, Yahoo, Giphy, and other image domains to identify URLs matching the terms submitted with the search. The search engine domains for each particular content type are predefined by the browser settings and can be modified in response to user input.

The search results from each of the search engines can include a SERP or other URL index of URLs having image content matching the search. The browser also creates a corresponding suppressed/parsed index that is used for navigating the content identified by/derived from the SERP/URL indexes. This suppressed index is also used to identify the links that are presented in the navigation control panel, as described earlier. However, rather than only listing particular webpages identified in a single SERP/index, this type of filtered search to multiple search engines will result in the browser obtaining search results (SERPs) from multiple search engines. When multiple different search engine results are received, the suppressed index will be built with multiple different entries in the suppressed index for the different SERP webpages (corresponding to the different search engines), such as with a link to the Google image SERP, a link to a Giphy SERP, a link to a Bing image SERP, and links to other specialized image search engine SERPs or general/filtered search engine SERPs etc.

The navigation control panel (if displayed) will also show links for these different webpages (some of which may be SERPS or other search engine index pages). When one of those links is selected, or other navigation input is received, the browser will reference the suppressed index to identify, access and display the linked content, which in some instances includes a SERP or other search engine index filtered for the particular type of content that was searched.

In the present embodiment, since the image pivot icon was selected for filtering search results to image content, the content type icon 1050 has been updated to reflect the coloring/type associated with the selected pivot icon. The pivot access icon 1080 has also been updated accordingly, with the same coloring and/or icon objects/labels.

The webpage 1010 that is shown is currently a webpage SERP for image content (e.g., Google images), including multiple links 1099 to image content available from a particular host search engine (i.e., Image Host 1).

A user can navigate to other webpages referenced in the suppressed index, such as other search engine SERPs for image content, by providing a gesture (as previously discussed) or by selecting one of the navigation controls 1060 or 1062.

Figure 11:
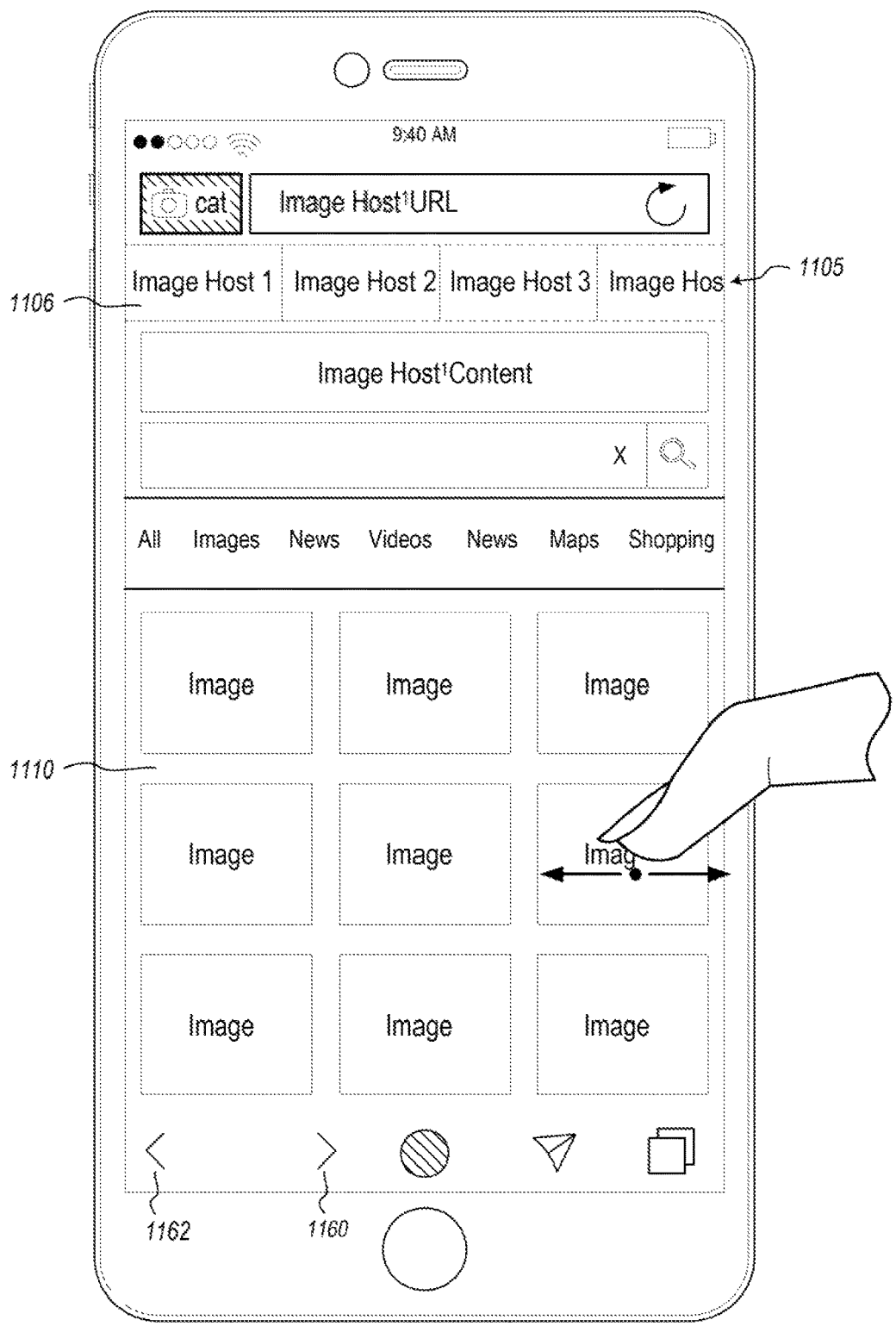
FIG. 11 illustrates an example of a browser interface corresponding to the browser interface of FIG. 10, in which the webpage is displayed with a navigation control panel listing webpage links associated with a suppressed index.

FIG. 11 illustrates a similar browser interface to the interface of FIG. 10. However, in this embodiment, navigation control panel 1105 is displayed and the webpage 1110 has been updated (reformatting content presentations) to accommodate the space requirements needed for the navigation control panel 1105. As shown, the image host 1 link 1106 is also left justified to reflect the webpage 1110 that is being displayed. The user can then navigate to the results from another search engine (for similar image links) by selecting the link for that search engine from the navigation control panel 1105 and/or by entering a swipe gesture or selection of control 1160 or 1162.

Figure 12:
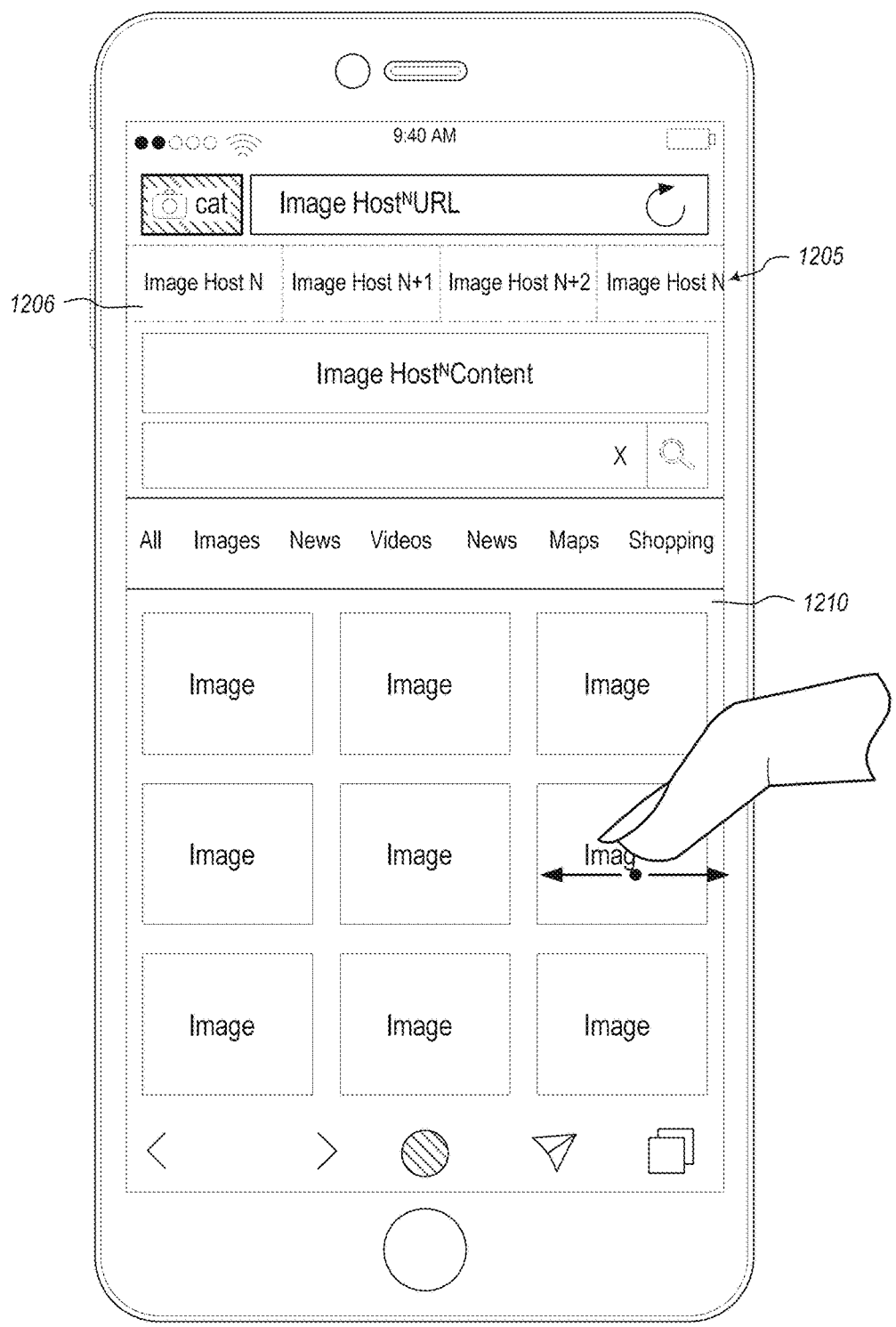
FIG. 12 illustrates an example of a browser interface similar to the browser interface of FIG. 11, in which the navigation control panel and the displayed webpage have been updated in response to user navigation to a different webpage link identified in the navigation control panel.

FIG. 12 illustrates another example of a browser interface similar to the browser interface of FIG. 11, in which the navigation control panel 1205 and the displayed webpage 1210 have been updated in response to user navigation to a different webpage link identified in the navigation control panel, namely, image host N 1206 (wherein image host N could be image host 2, 3, 4, etc.) or any other webpage identified in the suppressed index and which the user has navigated to, utilizing any of the navigation techniques and/or controls described herein.

Figure 13:
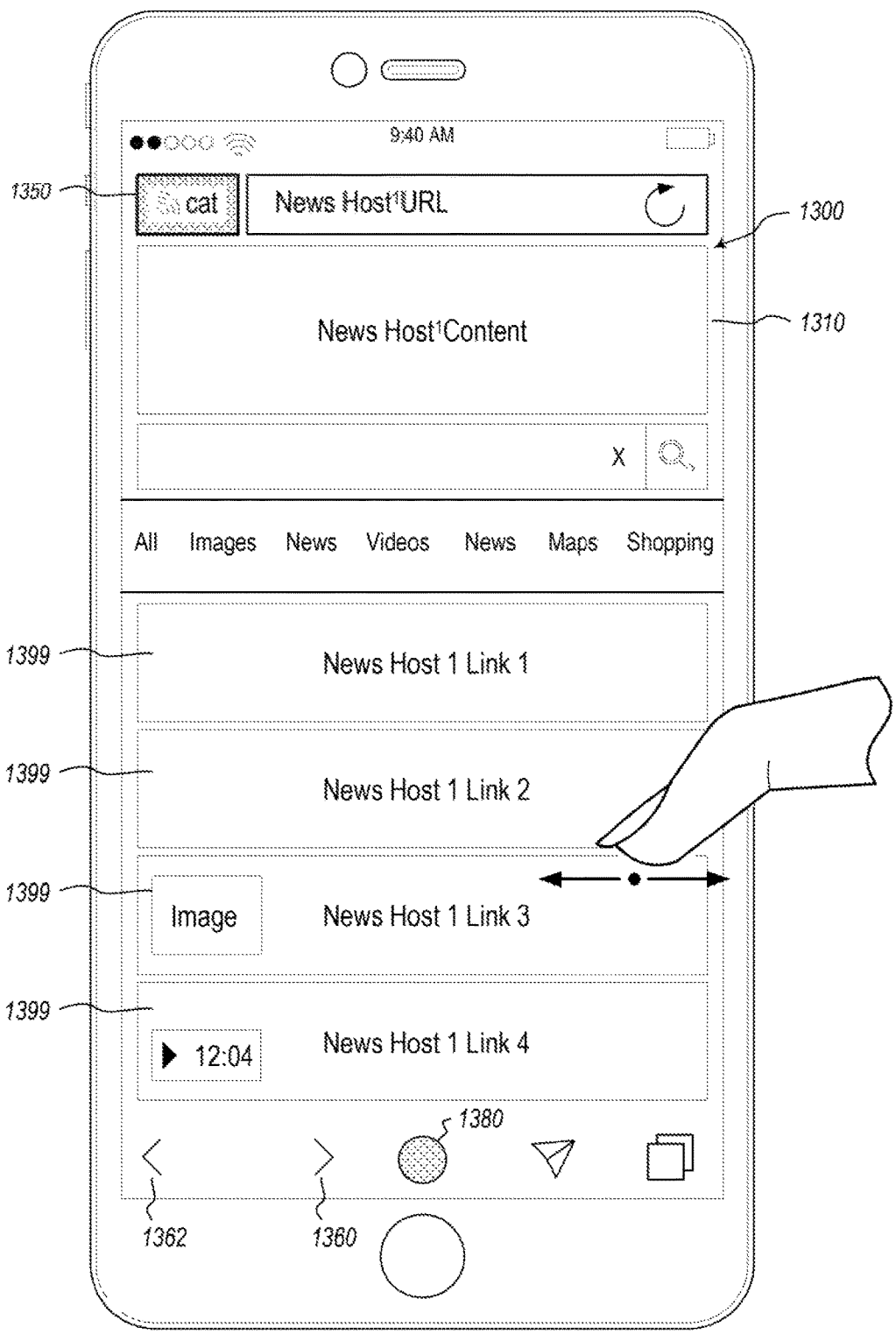
FIG. 13 illustrates an example of a browser interface corresponding to the browser interface of FIG. 1, in which a webpage is displayed in response to user input entered in the search field and also in response to a selection of the news pivot icon.

FIG. 13 illustrates an example of a browser interface 1300 corresponding to the browser interface 100 of FIG. 1, in which a webpage 1310 is displayed in response to user input entered in the search field 110 and also in response to a selection of the news pivot icon 128 of FIG. 1.

Accordingly, the browser performed a search with one or more search engine(s) for image content. As discussed above, with regard to the news content search, the browser obtains multiple different search results from different search engines specializing in providing content of the content type corresponding to the selected pivot icon. For instance, the browser, in response to a request for news content will perform a search with Bing, Google, Yahoo, AP, CNN, and other news domains to identify URLs matching the terms submitted with the search. The search engine domains for each particular content type are predefined by the browser settings and can be modified in response to user input.

The search results from each of the search engines can include a SERP or other URL index of URLs having news content matching the search. The browser also creates a corresponding suppressed/parsed index that is used for navigating the content identified by/derived from the SERP/URL indexes. This suppressed index is also used to identify the links that are presented in the navigation control panel, as described earlier. However, rather than only listing particular webpages identified in a single SERP/index, this type of filtered search to multiple search engines will result in the browser obtaining search results (SERPs) from multiple search engines. When multiple different search engine results are received, the suppressed index will be built with multiple different entries in the suppressed index for the different SERP webpages (corresponding to the different search engines), such as with a link to the Google news SERP, a link to a Yahoo news SERP, a link to a Bing news SERP, and links to other specialized news search engine SERPs (e.g., CNN) or general/filtered search engine SERPs etc.

The navigation control panel (if displayed) will also show links for these different webpages (some of which may be SERPS or other search engine index pages). When one of those links is selected, or other navigation input is received, the browser will reference the suppressed index to identify, access and display the linked content, which in some instances includes a SERP or other search engine index filtered for the particular type of content that was searched.

In the present embodiment, since the news pivot icon was selected for filtering search results to news content, the content type icon 1305 has been updated to reflect the coloring/type associated with the selected pivot icon. The pivot access icon 1380 has also been updated accordingly, with the same coloring and/or icon objects/labels.

The webpage 1310 that is shown is currently a webpage SERP for news content (e.g., Yahoo News), including multiple links 1399 to news content available from a particular host search engine (i.e., News Host 1).

A user can navigate to another webpages referenced in the suppressed index, such as other search engine SERPs for news content, by providing a gesture (as previously discussed) or by selecting one of the navigation controls 1360 or 1362.

Figure 14:
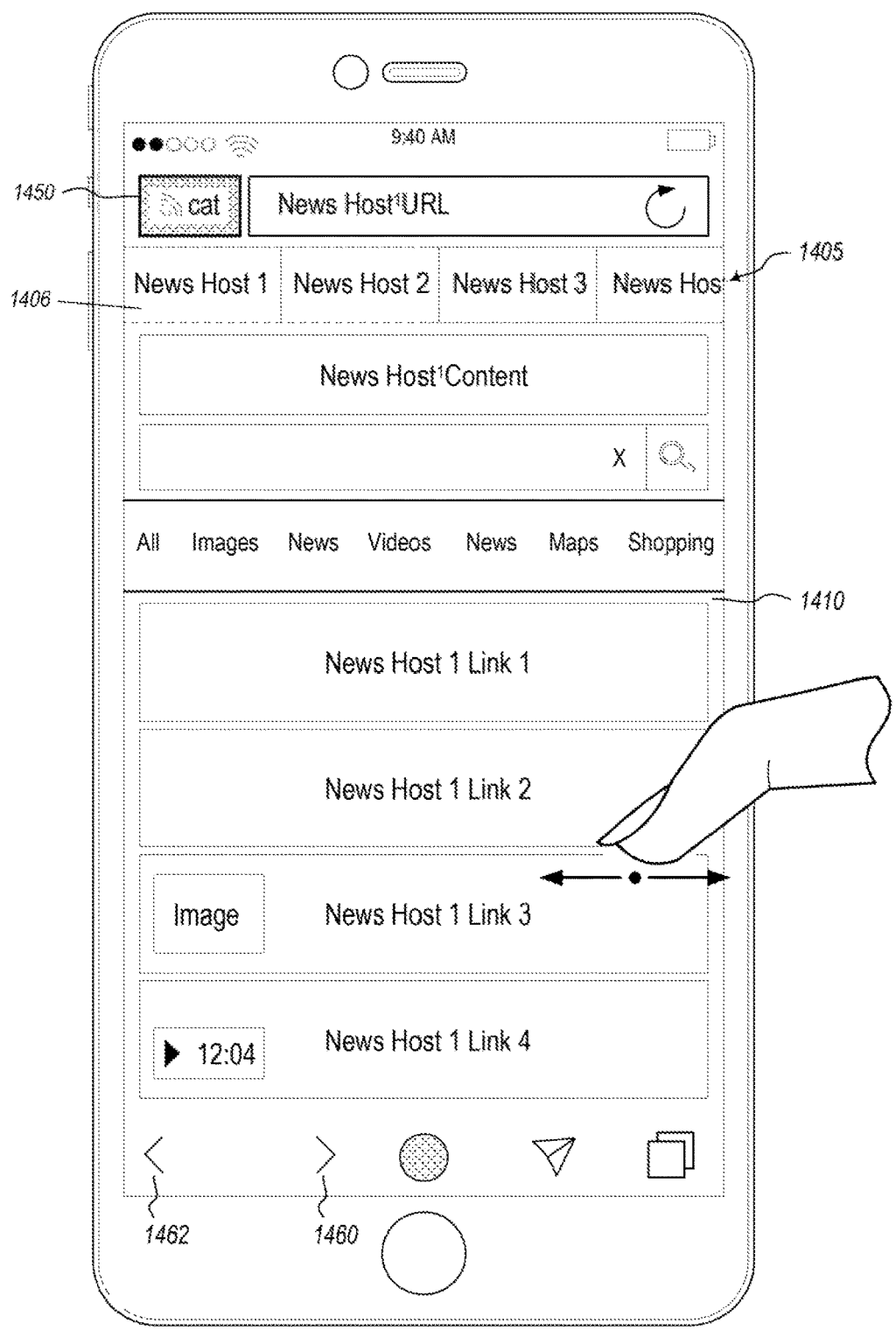
FIG. 14 illustrates an example of a browser interface corresponding to the browser interface of FIG. 13, in which the webpage is displayed with a navigation control panel listing webpage links associated with a suppressed index.

FIG. 14 illustrates a similar browser interface to the interface of FIG. 13. However, in this embodiment, navigation control panel 1405 is displayed and the webpage 1410 has been updated (reformatting content presentations) to accommodate the space requirements needed for the navigation control panel 1405. As shown, the news host 1 link 1406 is also left justified to reflect the webpage 1410 that is being displayed. The user can then navigate to the results from another search engine (for similar news links) by selecting the link for that search engine from the navigation control panel 1405 and/or by entering a swipe gesture or selection of control 1460 or 1462.

Figure 15:
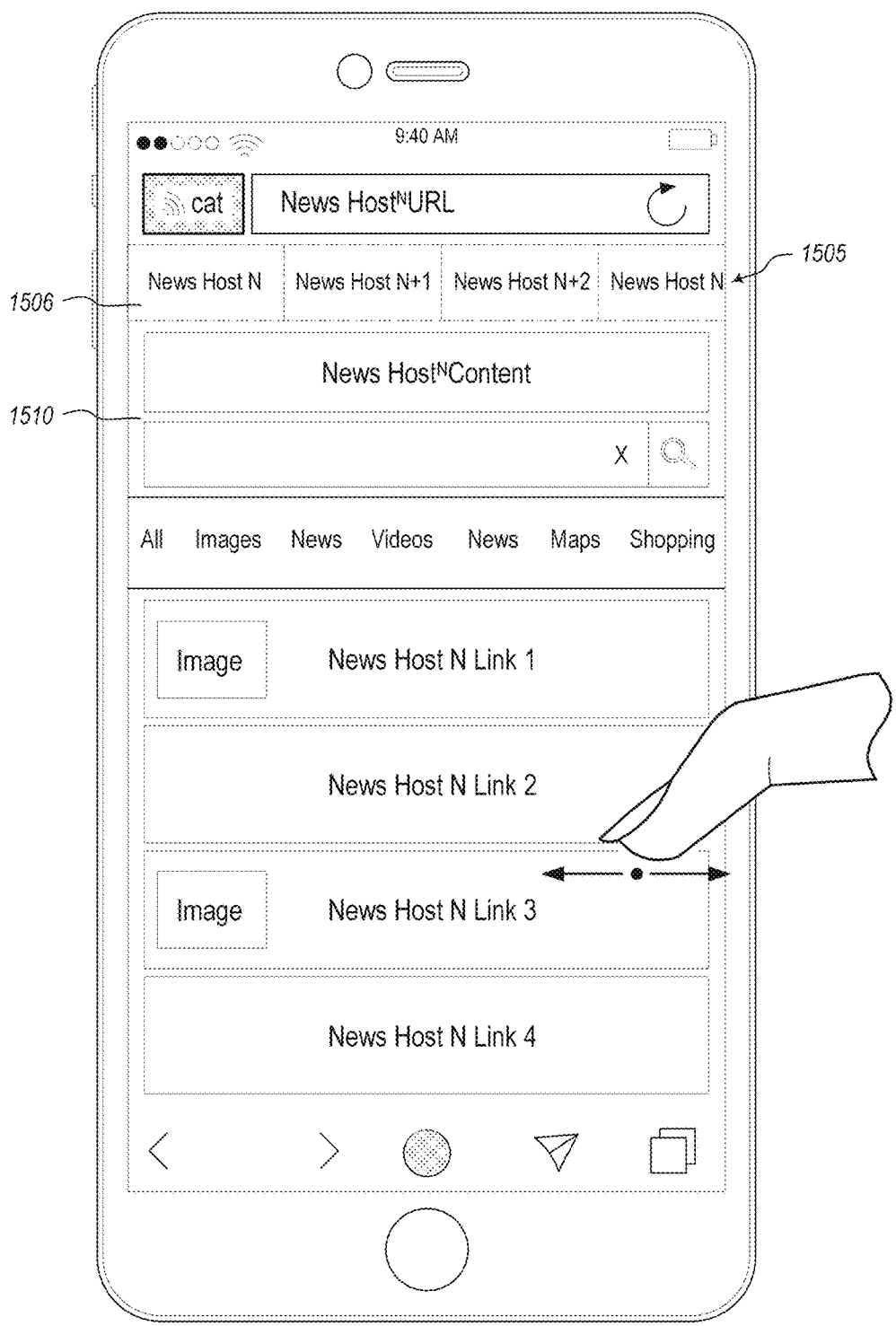
FIG. 15 illustrates an example of a browser interface similar to the browser interface of FIG. 14, in which the navigation control panel and the displayed webpage have been updated in response to user navigation to a different webpage link identified in the navigation control panel.

FIG. 15 illustrates another example of a browser interface similar to the browser interface of FIG. 14, in which the navigation control panel 1505 and the displayed webpage 1510 have been updated in response to user navigation to a different webpage link identified in the navigation control panel, namely, news host N 1506 (wherein news host N could be news host 2, 3, 4, etc.) or any other webpage identified in the suppressed index and which the user has navigated to, utilizing any of the navigation techniques and/or controls described herein.

Figure 16:
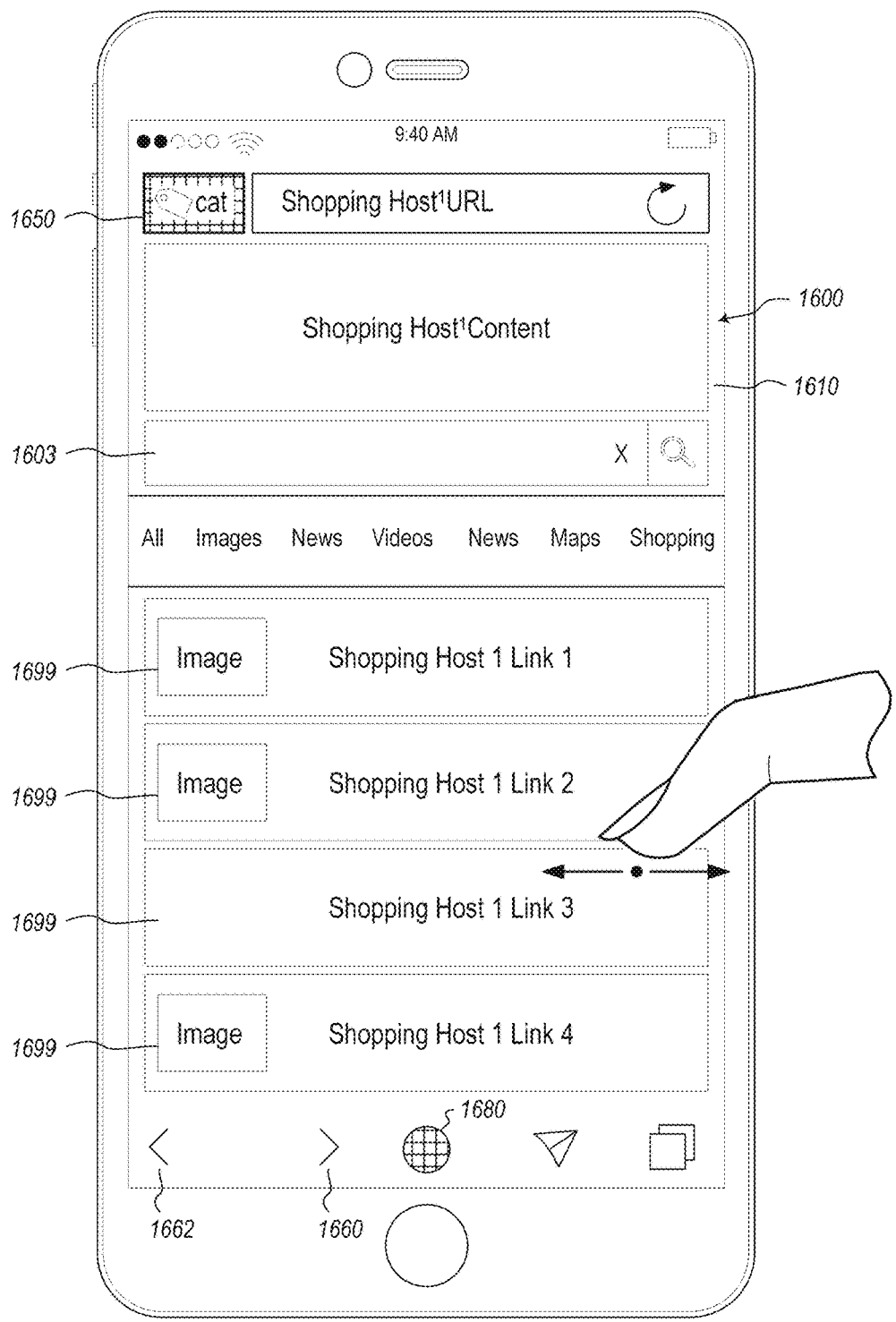
FIG. 16 illustrates an example of a browser interface corresponding to the browser interface of FIG. 1, in which a webpage is displayed in response to user input entered in the search field and also in response to a selection of the shopping pivot icon.

FIG. 16 illustrates an example of a browser interface 1600 corresponding to the browser interface 100 of FIG. 1, in which a webpage 1610 is displayed in response to user input entered in the search field 110 and also in response to a selection of the shopping pivot icon 129 of FIG. 1.

Accordingly, the browser performed a search with one or more search engine(s) for shopping content. As discussed above, with regard to the news content search, the browser obtains multiple different search results from different search engines specializing in providing content of the content type corresponding to the selected pivot icon. For instance, the browser, in response to a request for shopping content will perform a search with Bing, Google, Yahoo, Amazon, Ebay, and other shopping domains to identify URLs matching the terms submitted with the search. The search engine domains for each particular content type are predefined by the browser settings and can be modified in response to user input.

The search results from each of the search engines can include a SERP or other URL index of URLs having shopping content (e.g., items for sale) matching the search. The browser also creates a corresponding suppressed/parsed index that is used for navigating the content identified by/derived from the SERP/URL indexes. This suppressed index is also used to identify the links that are presented in the navigation control panel, as described earlier. However, rather than only listing particular webpages identified in a single SERP/index, this type of filtered search to multiple search engines will result in the browser obtaining search results (SERPs) from multiple search engines. When multiple different search engine results are received, the suppressed index will be built with multiple different entries in the suppressed index for the different SERP webpages (corresponding to the different search engines), such as with a link to the Google shopping SERP, a link to a Yahoo shopping SERP, a link to a Bing shopping SERP, and links to other specialized shopping search engine SERPs (e.g., Amazon, Ebay, etc.) or general/filtered search engine SERPs etc.

The navigation control panel (if displayed) will also show links for these different webpages (some of which may be SERPS or other search engine index pages). When one of those links is selected, or other navigation input is received, the browser will reference the suppressed index to identify, access and display the linked content, which in some instances includes a SERP or other search engine index filtered for the particular type of content that was searched.

In the present embodiment, since the news pivot icon was selected for filtering search results to news content, the content type icon 1650 has been updated to reflect the coloring/type associated with the selected pivot icon. The pivot access icon 1680 has also been updated accordingly, with the same coloring and/or icon objects/labels.

The webpage 1610 that is shown is currently a webpage SERP for shopping content (e.g., Amazon), including multiple links 1699 to shopping content available from a particular host search engine (i.e., Shopping Host 1).

A user can navigate to other webpages referenced in the suppressed index, such as other search engine SERPs for shopping content, by providing a gesture (as previously discussed) or by selecting one of the navigation controls 1660 or 1662.

Figure 17:
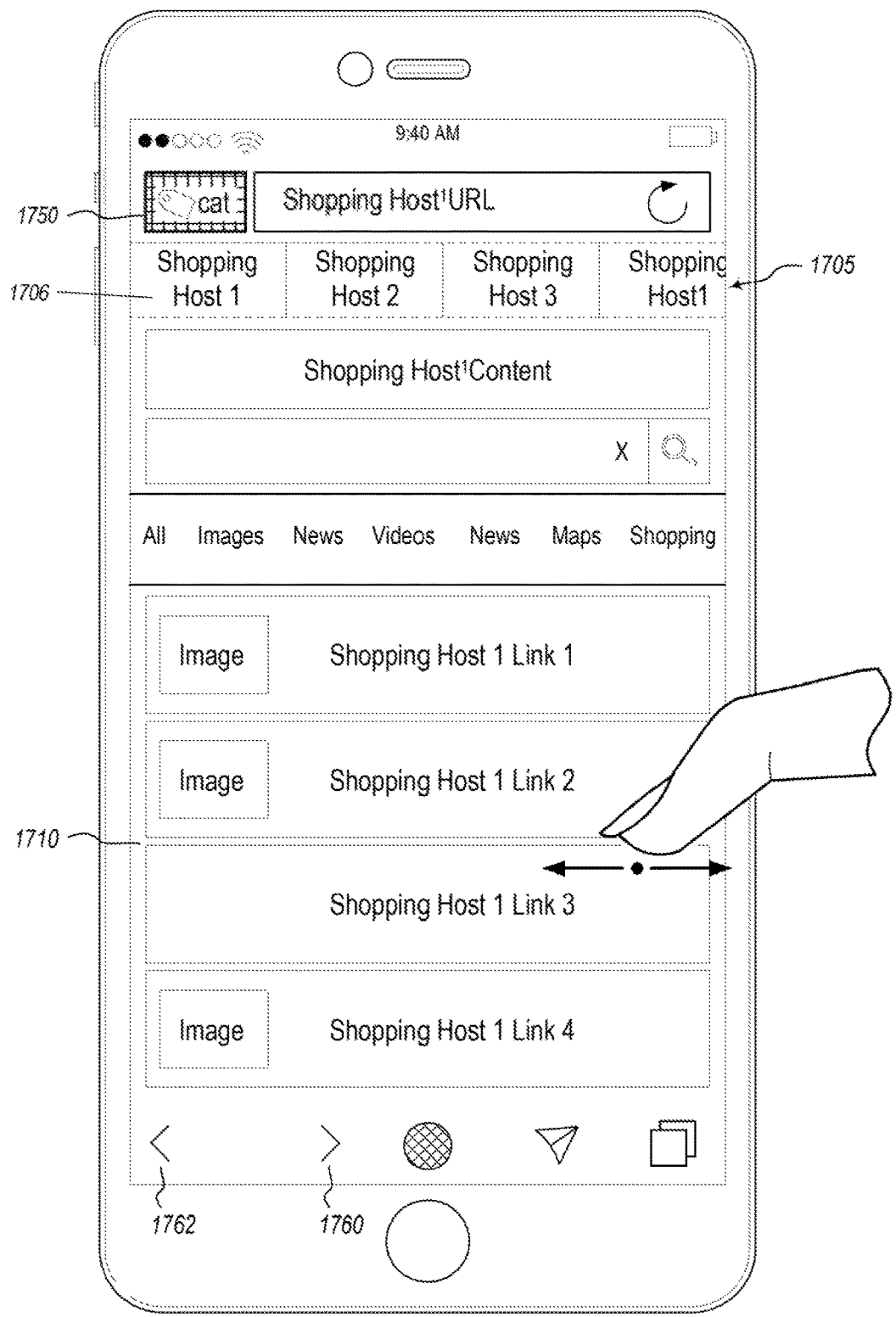
FIG. 17 illustrates an example of a browser interface corresponding to the browser interface of FIG. 16, in which the webpage is displayed with a navigation control panel listing webpage links associated with a suppressed index.

FIG. 17 illustrates a similar browser interface to the interface of FIG. 16. However, in this embodiment, navigation control panel 1705 is displayed and the webpage 1710 has been updated (reformatting content presentations) to accommodate the space requirements needed for the navigation control panel 1705. As shown, the shopping host 1 link 1706 is also left justified to reflect the webpage 1710 that is being displayed. The user can then navigate to the results from another search engine (for similar shopping links) by selecting the link for that search engine from the navigation control panel 1705 and/or by entering a swipe gesture or selection of control 1760 or 1762.

Figure 18:
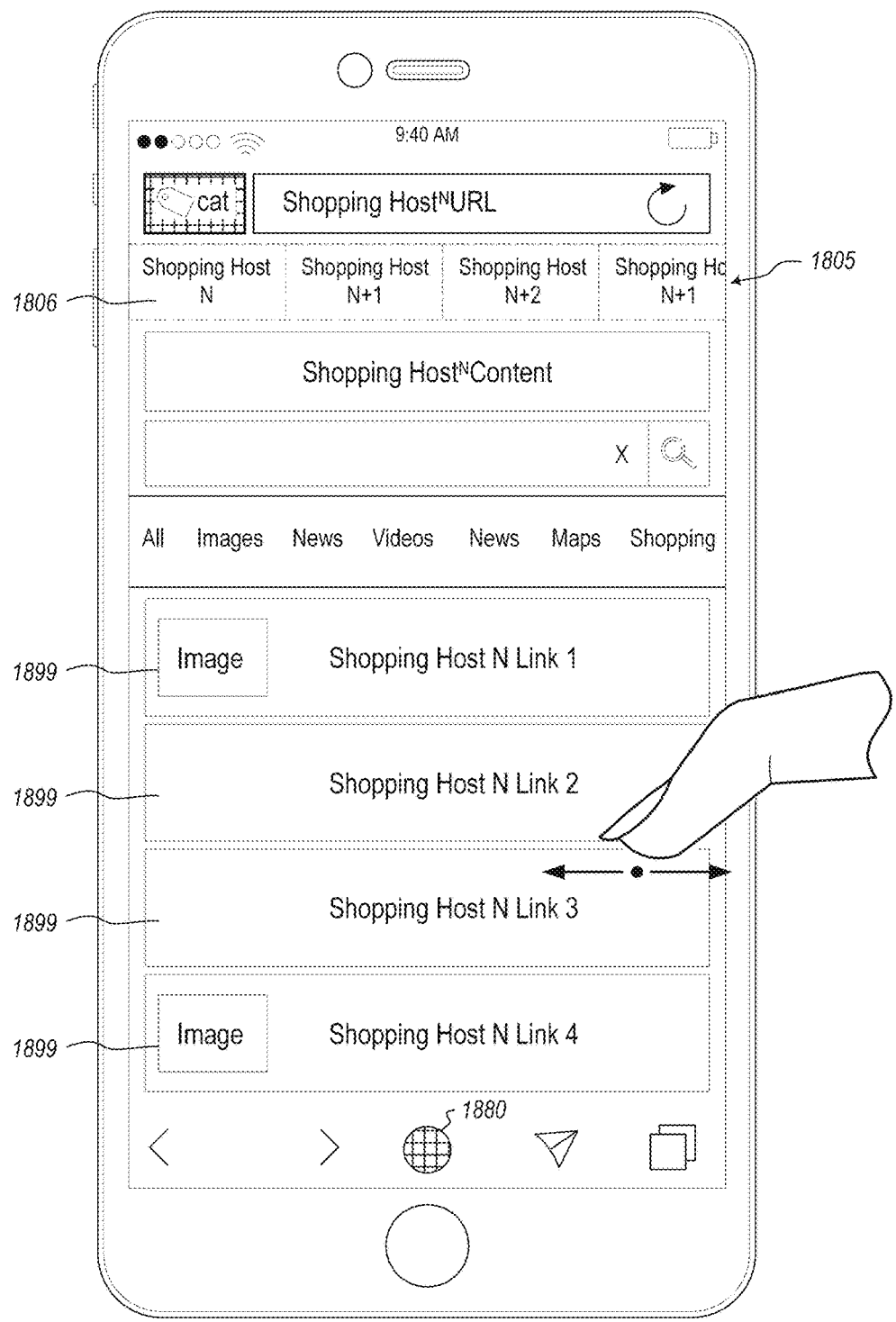
FIG. 18 illustrates an example of a browser interface similar to the browser interface of FIG. 17, in which the navigation control panel and the displayed webpage have been updated in response to user navigation to a different webpage link identified in the navigation control panel.

FIG. 18 illustrates another example of a browser interface similar to the browser interface of FIG. 17, in which the navigation control panel 1805 and the displayed webpage have been updated in response to user navigation to a different webpage link identified in the navigation control panel, namely, shopping host N 1806 (wherein shopping host N could be shopping host 2, 3, 4, etc.) or any other webpage identified in the suppressed index and which the user has navigated to, utilizing any of the navigation techniques and/or controls described herein.

Figure 19:
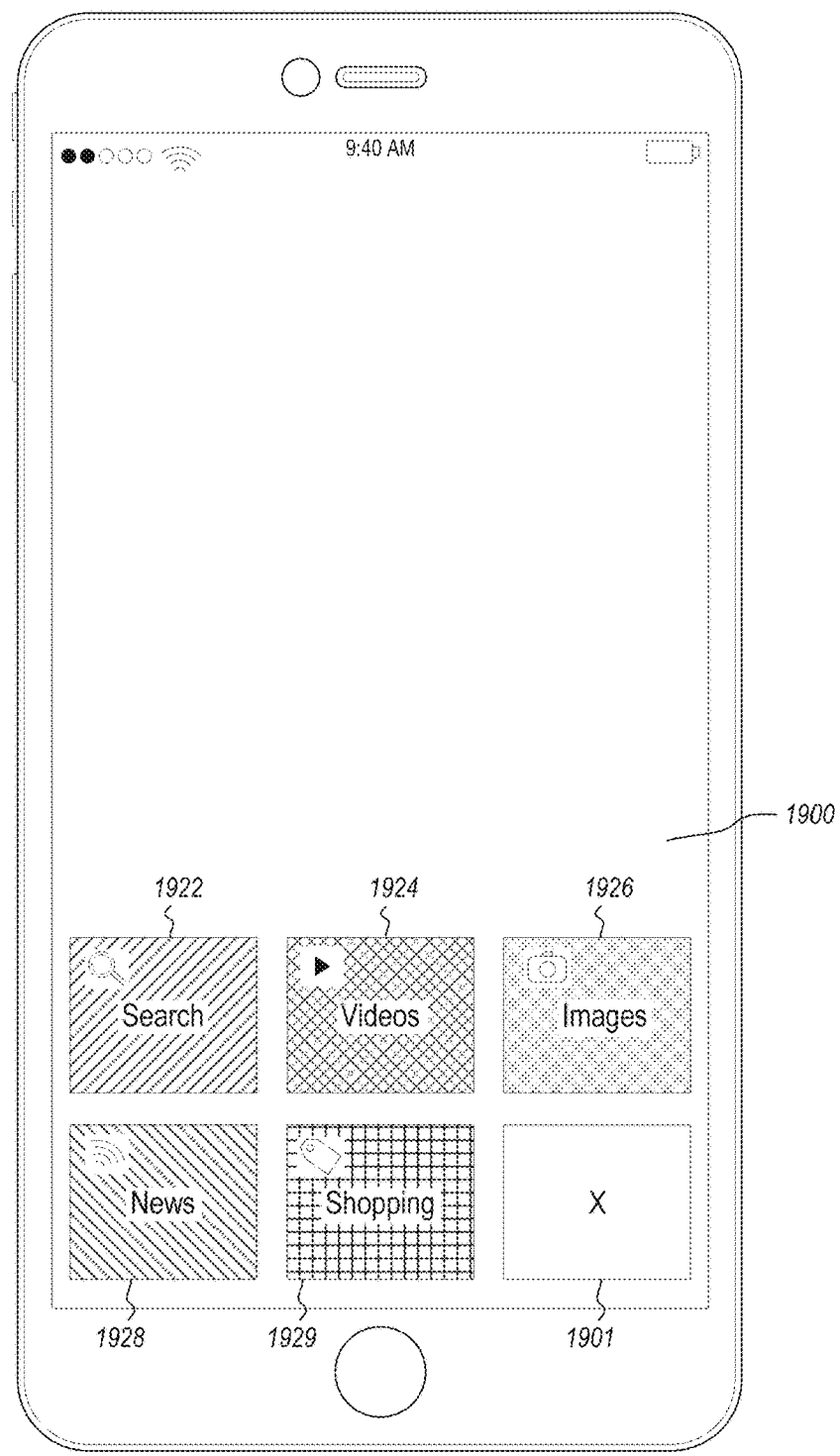
FIG. 19 illustrates an example of a browser interface illustrating another view of the plurality of pivot icons, including a general search pivot icon, a video pivot icon, an image pivot icon, a news pivot icon and a shopping pivot icon.

FIG. 19 illustrates an example of a browser interface 1900 that includes a presentation of the plurality of pivot icons 1922, 1924, 1926, 1928 and 1929, which correspond to the pivot icons discussed in FIGS. 1-18. These pivot icons include a general search pivot icon 1922, a video pivot icon 1924, an image pivot icon 1926, a news pivot icon 1928, and a shopping pivot icon 1929. The pivot icons may also include one or more additional and similar pivot icons (represented by icon 1901) for other content types, such as sports content, financial content, social content, etc.

The presentation of the pivot icons in browser interface 1900 may be triggered by a user selecting one of the pivot access icons (e.g., 280, 380 . . . 1880, etc.). The presentation order and format of the pivot icons can be controlled by the access history of the user with the browser, which is stored and referenced when presenting the pivot icons. Selection of a pivot access icon may also cause the browser to, alternatively, display the pivot icon array that was shown and described in the other images, along with a display of other content (e.g., a webpage).

A user can sequentially select different pivot icons (e.g., by selecting the pivot access icon) between the examination of different search results corresponding to the different federated/filtered searches. For example, the user can first examine image content for a particular search query and then access/select the video pivot icon to view video content corresponding to the same search query/terms, without having to resubmit the same search query/terms. Even more particularly, the user can navigate between different types of content for a same search term (e.g., cat), without having to retype the term cat for each content type search. Instead, the user can navigate between the different types of search content types by accessing and selecting the different pivot icons. Each time a different pivot icon is selected, the browser will formulate and send an appropriate search to the correspondingly relevant search engines or other sources, as described above. Alternatively, the system may preform and send searches for different content types, even before the user selects a different pivot icon, such as based on determining a user preference or setting for causing the browser to perform such a search on different content types.

In some embodiments, the pivot icons may also include (rather than just federated filters to different content types) one or more links to specialized websites (e.g., Amazon, Ebay, etc.). This may be beneficial, for example, when a user preference is to shop with a particular entity (e.g., Amazon). In this instance, the shopping pivot icon can be replaced by an icon to Amazon or may link directly to Amazon. In some instances, the pivot icon is changed to reflect branding/labeling associated with the particular website in some instances. In other instances, the pivot icon does not change from a default and universal presentation format, even when it links to a particular website.

For instances when the pivot icons are supplemented by or replaced by one or more specific webpages, then the methods of the invention will include providing index generation and suppression for the particular web sites when the corresponding pivot icon for that website is selected from the pivot icon menu control. For instance, if the shopping icon was replaced by an icon linking to Amazon, rather than linking to a federated search for a plurality of search sources, then a search would be generated by the browser for the website (e.g., Amazon). Then, the results (e.g., Amazon SERP) would be used to generate a suppressed/derivative index of links/citations from the Amazon result page. The Amazon result page would then be hidden from view, automatically, while the first result from the suppressed index would be displayed, similar to the functionality described in FIGS. 3-6, enabling navigation to the different links associated with the results and also enabling navigation to the hidden Amazon SERP.

Figure 20:
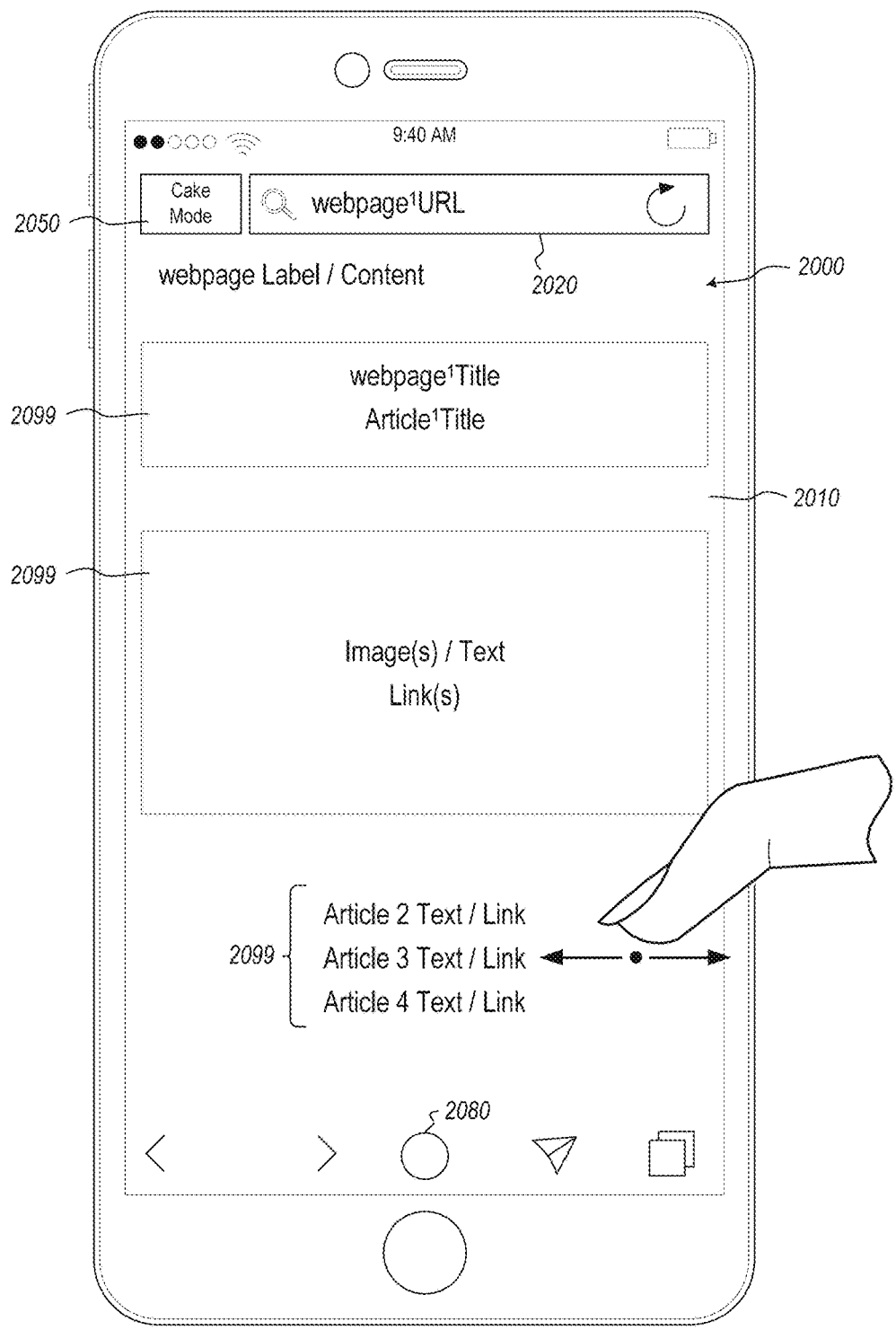
FIG. 20 illustrates an example of a browser interface that is displaying a webpage with a browser mode icon that is selectable to cause the browser to operate in a different mode.

FIG. 20 illustrates an example of a browser interface 2000 that is displaying a webpage 2010 with a browser mode icon 2050 that is selectable to cause the browser to operate in a different mode, as will be described in more detail below. The current webpage 2010 includes various content, including titles, images and links, as provided by the webpage host. The user can navigate to the webpage by accessing a link from one of the previous interfaces or by typing a URL of the webpage into the URL field 2020.

Then, if the user wants to access any of the linked content, the user will have to click on one of the links. Thereafter, if the user wants to access another link, the user will have to navigate back to the webpage 2010 to access another link.

In some embodiments, however, the user can automatically navigate through the different linked content without having to return to the webpage identifying the content. This is accomplished by the browser creating and/or referencing a derivative index for the webpage and then enabling the user to navigate through the different links of the page directly from the derived index. The links that are indexed can be reflected in a navigation control panel, similar to the navigation control panels discussed above.

A user can trigger the navigation of the derived index by selecting the browser mode icon 2050 or the browser mode indicator 2080 or by selecting another interface object (not shown), or by performing a particular type of gesture on the display screen associated with the different browser mode (e.g., drawing a letter 'C' on the display screen).

Figure 21:
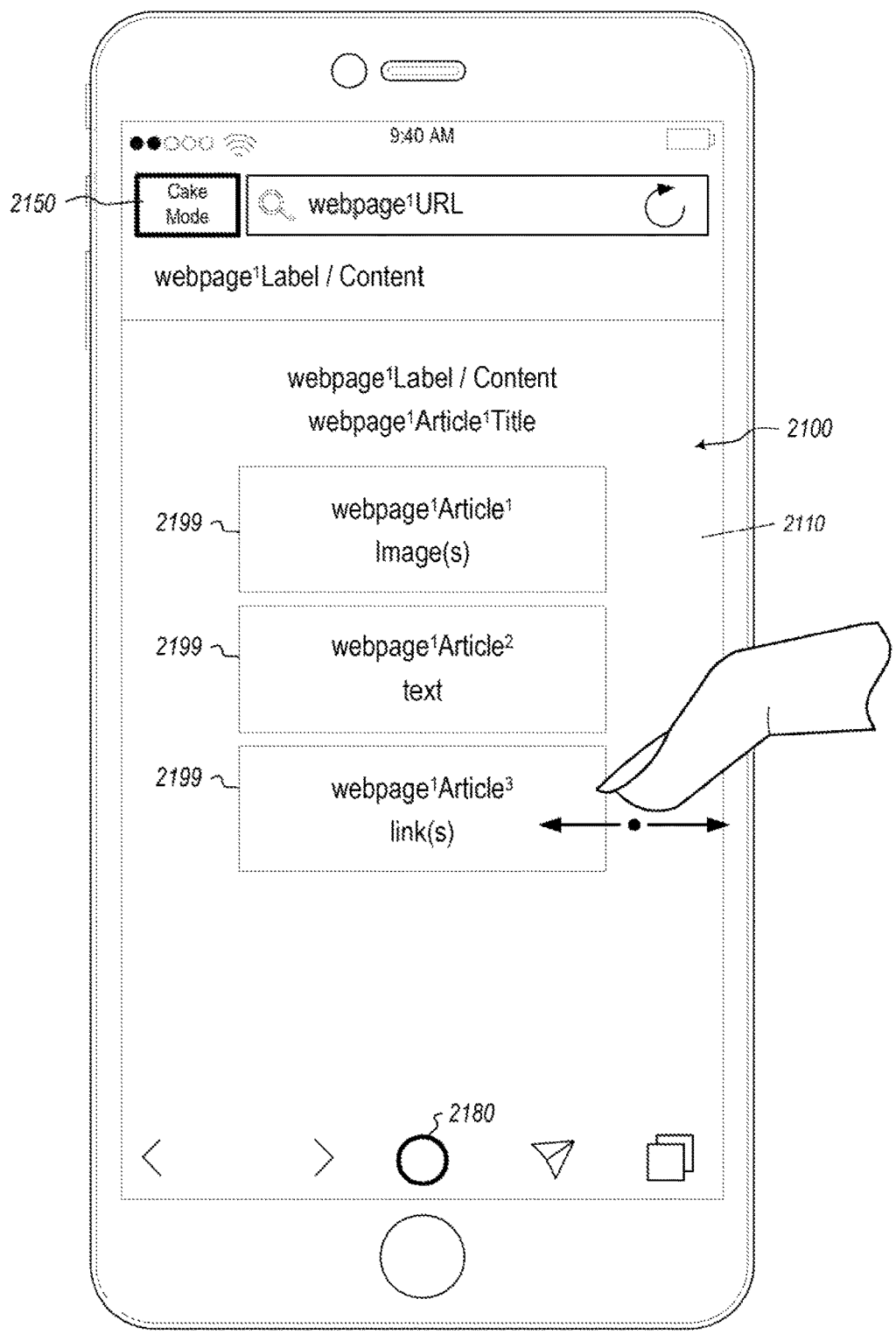
FIG. 21 illustrates an example of a browser interface corresponding to the browser interface of FIG. 20, after the browser mode icon has been selected.

FIG. 21 illustrates an example of a browser interface 2100 corresponding to the browser interface 2000 of FIG. 20, after the browser mode icon 2050 has been selected. Browser mode icon 2150 and browser mode indictor 2180 have a different color, highlighting, size, or other format from the format used in the browser mode icon 2050 and browser mode indicator 2080 shown in FIG. 20, to reflect that the new browser mode is being used, wherein the new browser mode is based on the derived index referenced above.

In the new browser mode, the browser automatically accesses and displays a first listed webpage from the derived/suppressed index. In this case, the first listed webpage is webpage 2110 with specific content 2199 of that webpage 2110.

Figure 22:
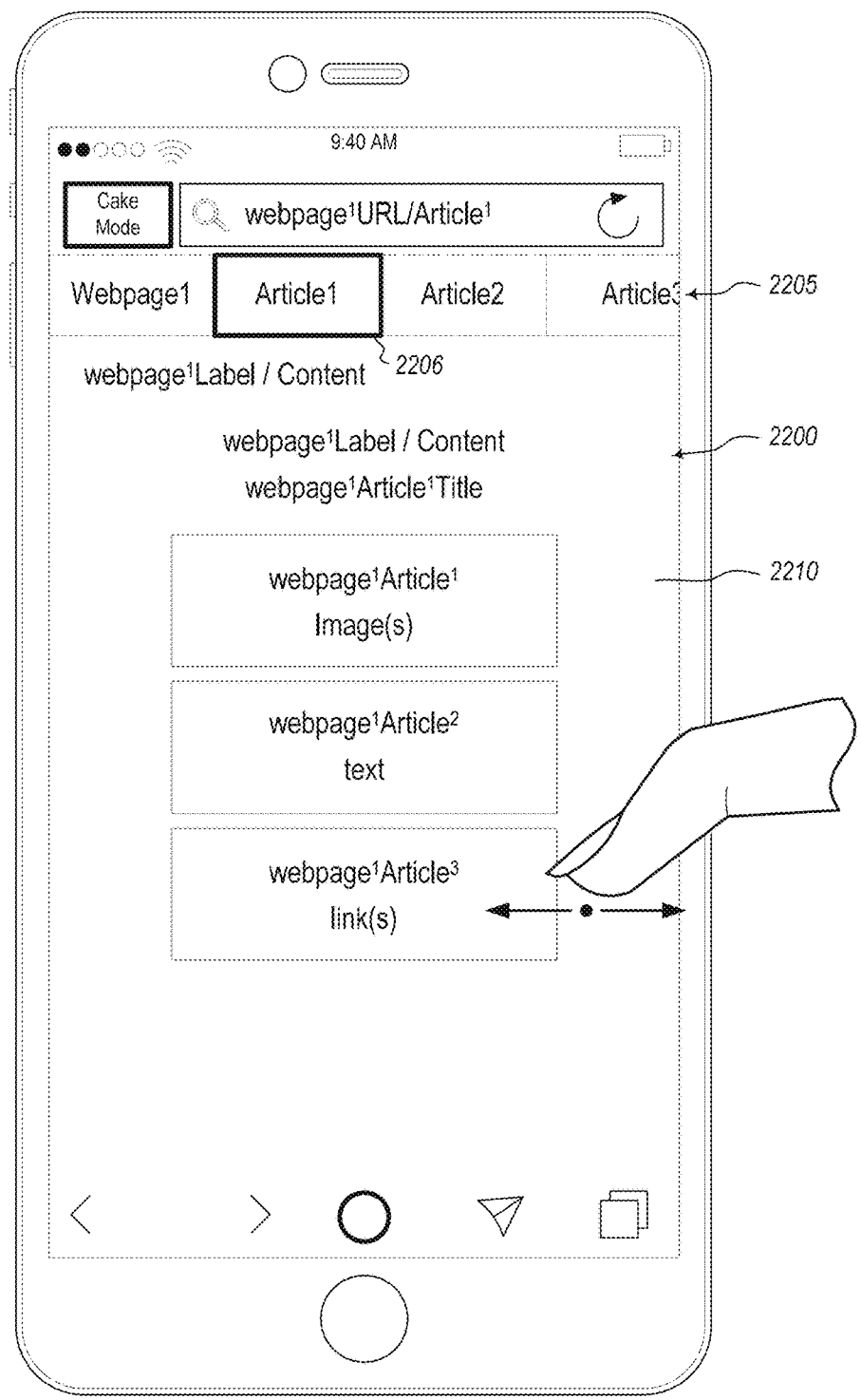
FIG. 22 illustrates an example of a browser interface corresponding to the browser interface of FIG. 21, in which the webpage is displayed with a navigation control panel listing webpage links associated with a suppressed index.

FIG. 22 illustrates an example of a browser interface 2200 corresponding to the browser interface 2100 of FIG. 21, in which the webpage 2210 is displayed with a navigation control panel 2205 listing webpage links associated with a suppressed index and which includes a link 2206 to the displayed webpage and which is highlighted/emphasized to reflect the link 2206 that is associated with the displayed webpage 2210.

Figure 23:
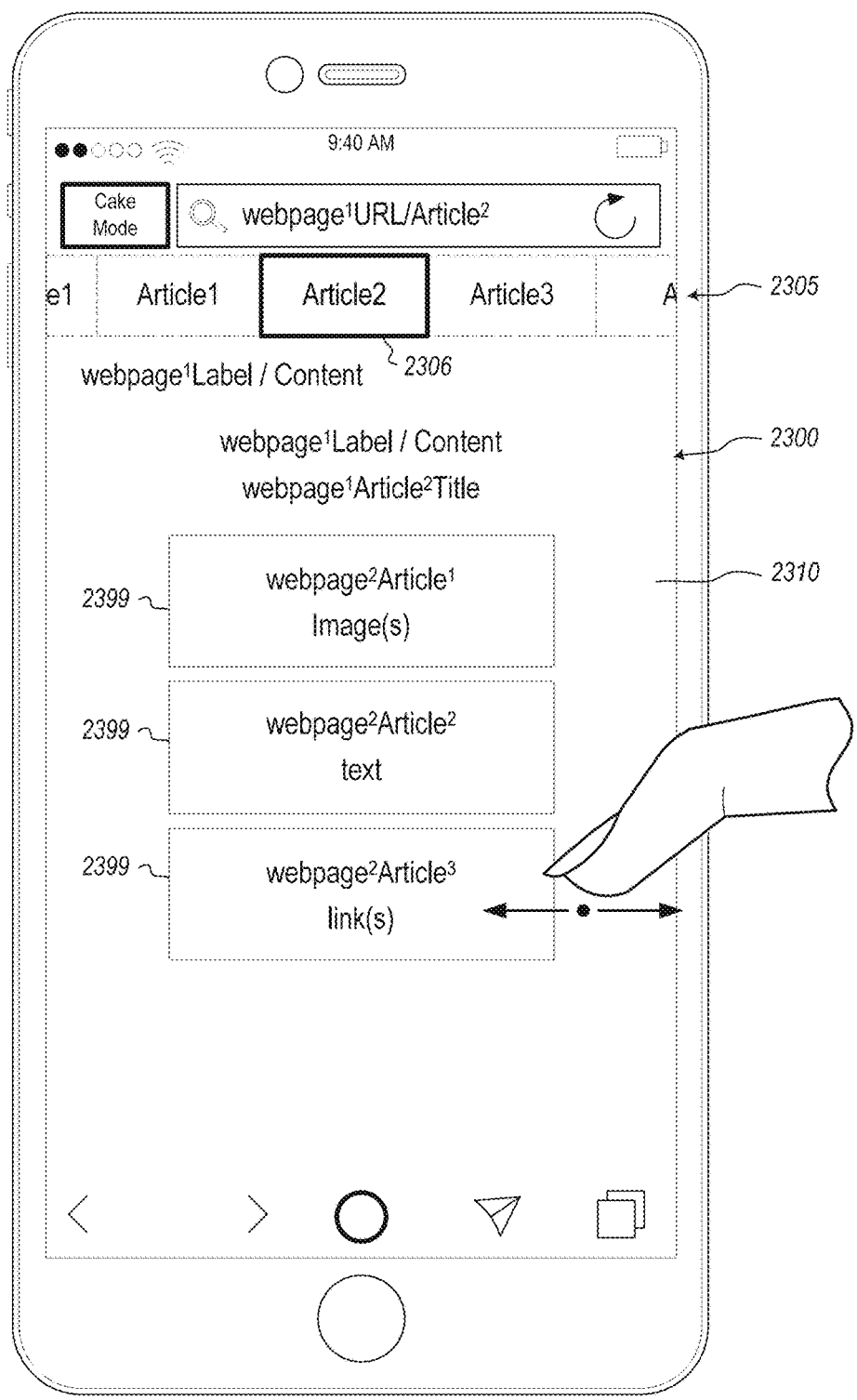
FIG. 23 illustrates an example of a browser interface similar to the browser interface of FIG. 22, in which the navigation control panel and the displayed webpage have been updated in response to user navigation to a different webpage link identified in the navigation control panel.

FIG. 23 illustrates an example of a browser interface 2300 similar to the browser interface 2200 of FIG. 22, in which the navigation control panel 2305 and the displayed webpage 2310 have been updated in response to user navigation to a different webpage link identified in the navigation control panel 2305, corresponding to a next webpage in the suppressed/derived index, utilizing any of the navigation techniques/controls described previously.

Figure 24:
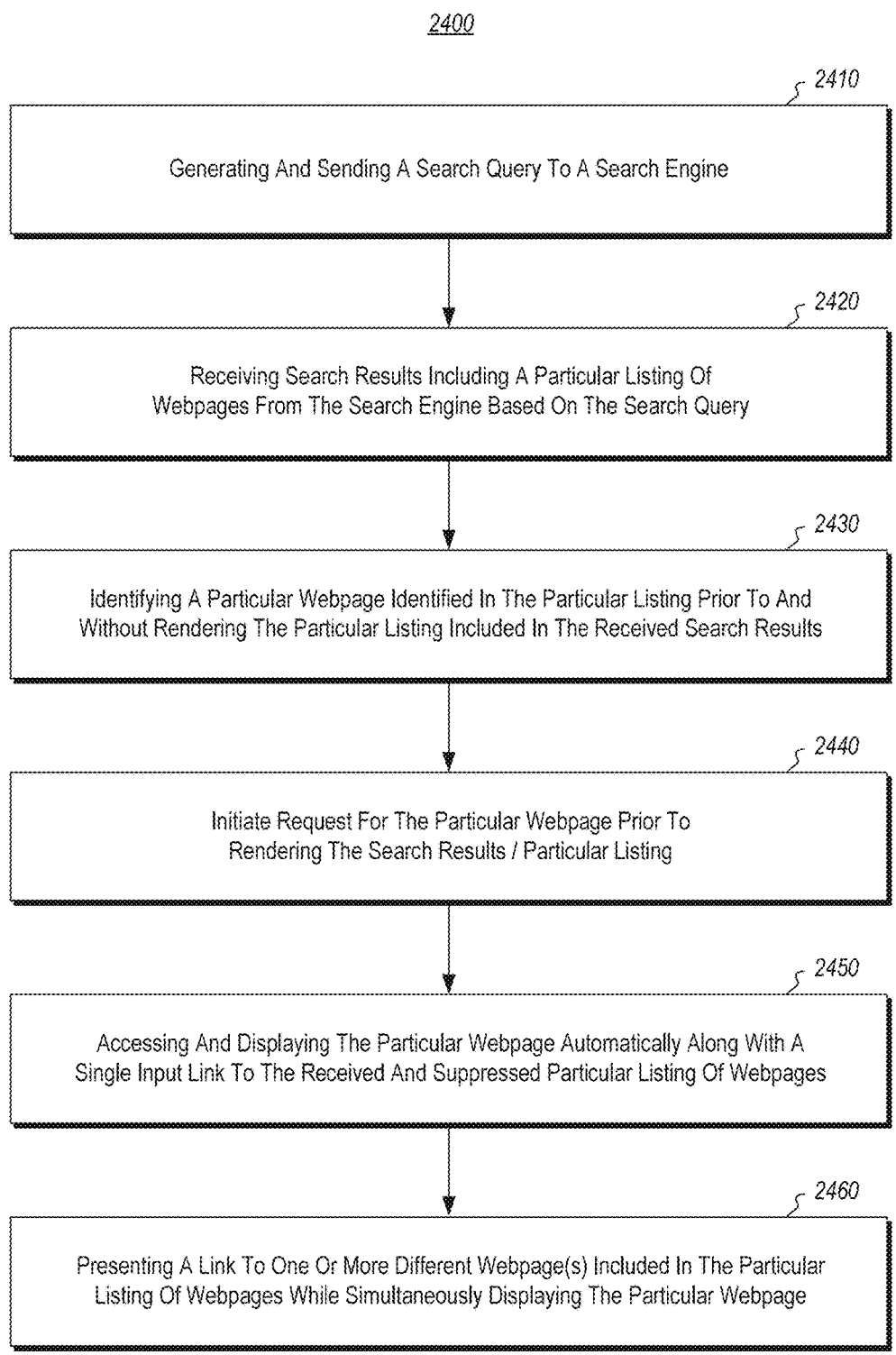
FIG. 24 illustrates a flow diagram of different acts that are associated with disclosed embodiments for accessing and navigating internet content with a browser based on a suppressed index corresponding to the search results.

FIG. 24 illustrates a flow diagram 2400 of different acts that are associated with disclosed embodiments for accessing and navigating internet content with a browser based on a suppressed index corresponding to the search results. As shown, the disclosed embodiments include acts of generating and sending one or more search query to one or more search engine(s) (2410), such as based on user input entered into a browser search field. The browser also receives search results from the search engine(s) based on the search query, the search results including a particular listing of webpages identified by the search engine (2420). In some instances, the search results comprise a SERP of one or more search engine(s) and/or a listing of a specialized website (e.g., Amazon, Ebay, Youtube, etc.). The one or more search result index can include, for example, the SERP shown in FIG. 26.

The disclosed methods also include, prior to and (sometimes) without rendering the particular listing(s), identifying a particular webpage identified in the search results (act 2430). The particular webpage can be identified, for example, by referencing a derivative index that is built from the search engine results and that is suppressed in memory. This derivative index can include, for example, the parsed and suppressed index of FIG. 26.

Next, the system initiates a request for the particular webpage, still prior to rendering the particular listing that was returned from the search results (e.g., the SERP) (act 2440), and without rendering the derived index. The particular webpage is also accessed and displayed automatically (without a specific user request for the webpage initiated from interfacing with the SERP/search result index) (act 2450). Links to one or more other webpages, sometimes even webpages that are hosted by different domains, are presented (such as in the navigation control panel discussed above). In some instances, the webpage is displayed and the link(s) to other webpages are displayed while the browser also provides a one input link to the particular search result index/listing of webpages (e.g., the SERP).

In some embodiments, the search query is based on user input entered at browser of the search engine hosted by a first domain (e.g., search engine domain) and the particular webpage is rendered independently from the first domain and by a second domain (e.g., a domain other than the search engine domain).

In some instances, the one input link to the particular search result index/listing comprises an undisplayed swipe gesture link. In other embodiments, the one input link comprises a displayed object/icon that, when selected, causes the browser to display the SERP or other index. Such an icon can be a navigation control panel icon and/or a navigation arrow icon.

Figure 25:
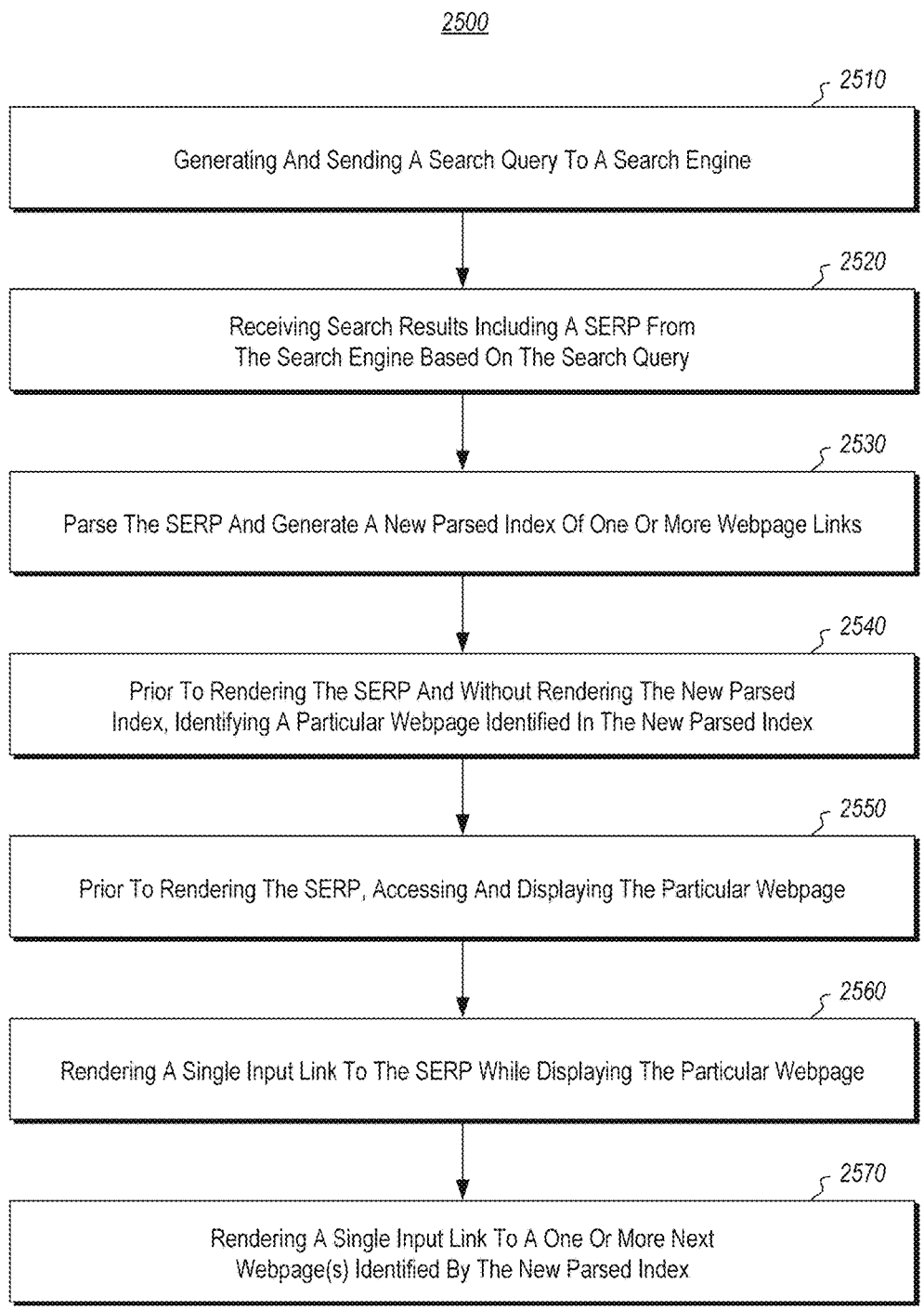
FIG. 25 illustrates a flow diagram of different acts that are associated with disclosed embodiments for accessing and navigating internet search results with a browser without requiring a user to navigate the internet content from the SERP.

FIG. 25 illustrates a flow diagram 2500 of different acts that are associated with disclosed embodiments for accessing and navigating internet search results with a browser without requiring a user to navigate the internet content from the SERP. As shown, the embodiments include a browser suppressing and utilizing a SERP (search engine results page) to facilitate the navigation of content. For instance, some disclosed embodiments include the browser generating and sending a search query to a search engine (act 2510), as well as receiving search results from the search engine based on the search query, wherein the search results include at least one SERP (search engine result page) (act 2520). Sometimes, the results also include multiple SERPs from multiple search engines hosted by different domains.

Figure 26:
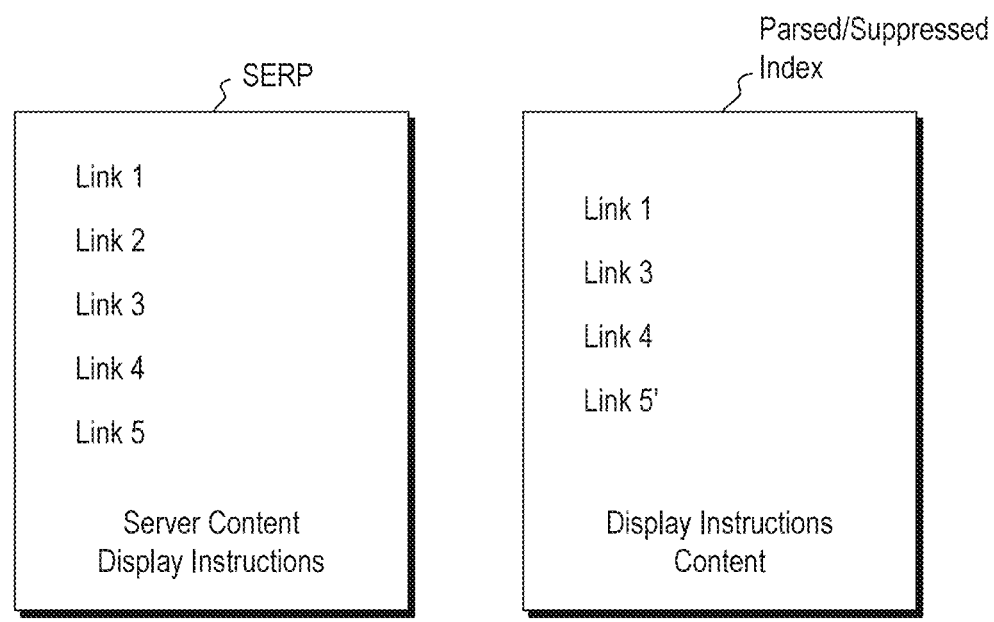
FIG. 26 illustrates components of a SERP and a parsed/suppressed index that is derived from the SERP or a sitemap file.

Then, the system/browser parses the SERP(s) prior to and without rendering the SERP(s), to generate a new parsed index of one or more webpage links (e.g., URLs) (act 2530). An example of a SERP and the corresponding parsed index is shown in FIG. 26.

This parsed index is suppressed in memory, without being displayed. But, it is referenced by the browser to control access to a next website in response to navigation input detected by the browser. It will be noted that the list of websites in the suppressed index is loaded into memory on the computer system outside of the document object model (DOM) used by the web browser to generate the displayed web page. Accordingly, operations that use the suppressed list including parsing and navigation take place outside of the DOM on a different layer in memory. As such, users may be prevented from accessing the suppressed indexes using a web scripting language.

Furthermore, as illustrated, at least one link in the SERP (i.e., link 2) is omitted from the parsed/suppressed index. One or more links will be omitted, in some instances, in response to determining that the links are associated with undesired content or black listed domains/websites. As previously noted, navigating forward or backward between different webpages associated with the displayed webpage links in the browser interfaces, response to user input entered at the browser interfaces, will be based on a sequence of the listing of webpage links defined by the new parsed index, rather than a different sequence of the listing of webpage links defined by the SERP. This is important, particularly when the parsed index omits links, or when the parsed index reorders links based on predetermined criteria (e.g., alphabetical, how recent the documents have been indexed, user profile preferences, previous access logs, etc.). While navigating the listed webpages, the browser continues to refrain from displaying the new parsed index. It simply references the parsed index to identify a next or previous webpage.

In some instances, parsers filter the list of the links from the search results (e.g., SERP) to omit or one or more of the search results from being loaded into memory as part of the suppressed index and/or from being displayed. In some instances, the filtering is used to filter/omit particular types of content from being loaded/displayed, such as pornographic or offensive content. The filtering may be done upfront, or may be based on blacklisted URLs, on content descriptions, and/or dynamically upon or during the loading of the content into memory. For instance, the content may be examined during and after the loading of content into memory, based on further examination of content terms, image profiles, metadata, etc. Content that is determined to be offensive will trigger the removing the corresponding search result from the suppressed list. In some instances, the search result remains in the suppressed list, but it is simply skipped during navigation. This may include preventing the undesired website links from displayed in the navigation control panel. This type of filtering can be beneficial because it prevents a user from accidentally stumbling across content that they may not have desired to navigate to. This can also improve functioning of the computer by filtering/omitting results that are associated with malware, by preventing a user from unwittingly navigating to a website having associated malware that is detected during the parsing.

Once the suppressed index is built, the browser identifies a particular webpage identified in the search results, such as, for example, from the derived/suppressed index. Typically, system identifies the first listed link. In other instances, when the suppressed index is configured to include the SERP as a first identified link, the browser may automatically identify and load the first link after the SERP. In some instances, the browser identifies and precaches a predetermined number of webpages, such as corresponding to each link displayed in the navigation control panel, or another quantity (e.g., 2, 3, 4, 5 or another quantity. The SERP may also be preloaded and cached, but hidden from view, until the user navigates to the SERP, as described above.

In some instances, when the search results include multiple SERPs based on searches to multiple search engines corresponding to a filtered pivot search. In such instances, the derived and suppressed index may identify and list a plurality of websites comprising the SERPs and then the browser, in such instances, may automatically render the first SERP as the identified webpage, as generally described above.

In instances where the index is derived from a single SERP, the identified webpage (act 2540) is accessed and displayed (act 2550) while also providing a one input link to the SERP, which is initially hidden from view. (act 2560). Links to other webpages are also provided (act 2570).

Figure 27:
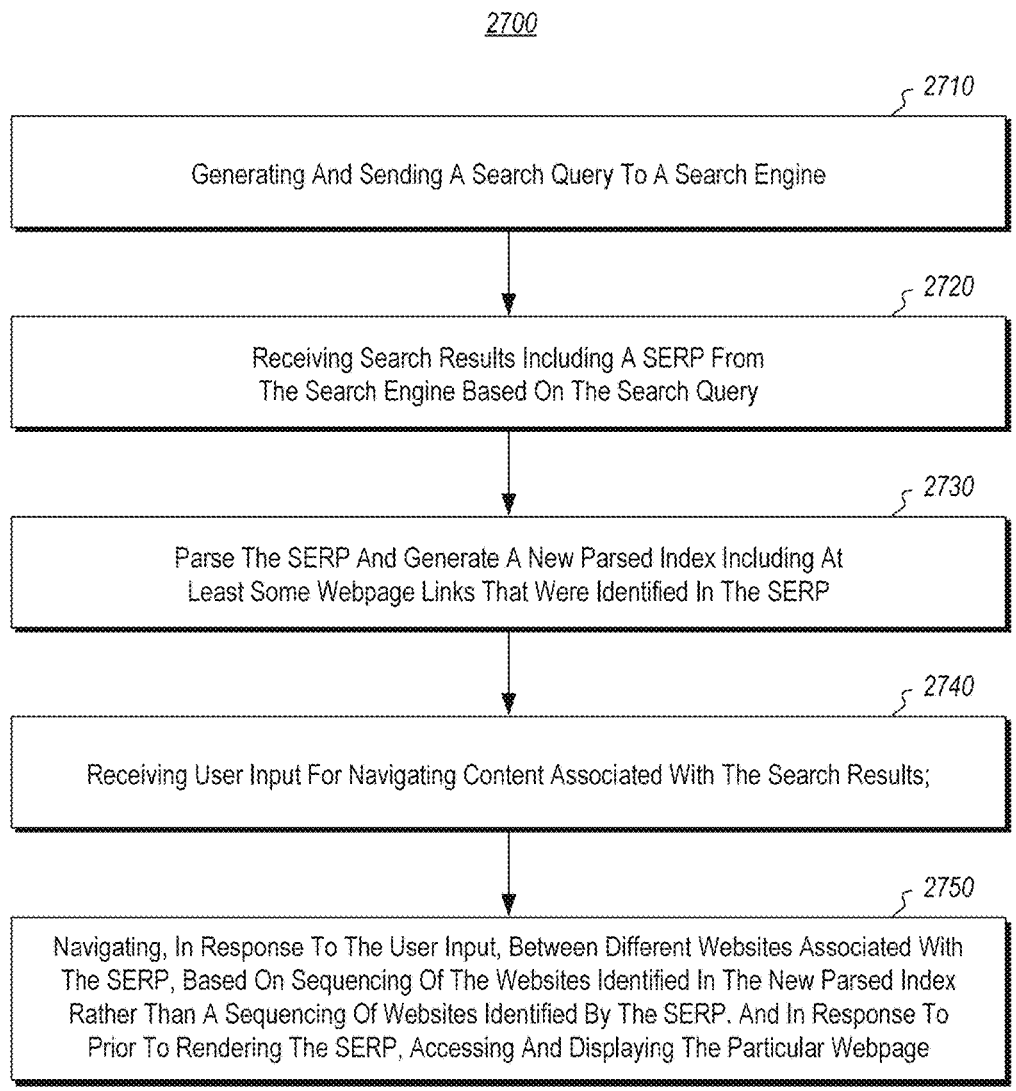
FIG. 27 illustrates a flow diagram of different acts that are associated with disclosed embodiments for accessing and navigating internet content with a browser based on a suppressed index corresponding to the search results.

FIG. 27 illustrates another flow diagram 2700 of different acts that are associated with disclosed embodiments for accessing and navigating internet content with a browser based on a suppressed index corresponding to the search results. In this embodiment, the illustrated acts include a browser generating and sending a search query to a search engine (act 2710). Search results are also received from the search engine based on the search query, the search results comprising a SERP (search engine result page) (act 2720). Thereafter, the system/browser parses the SERP and generates a new parsed index of webpage links that comprises a subset of webpage links from a listing of webpage links identified by the SERP which omits at least one webpage link identified by the SERP (act 2730). The system then accesses and displays a particular webpage identified in the search results with links for navigating forward or backward to other webpages identified in the search results. Then, upon receiving user input for activating the links for navigating forward or backward to the other webpages identified in the search results (act 2740) the system references the new parsed index of webpage links to determine which next webpage to display, rather than referencing the SERP (act 2750). This includes the system accessing and displaying the next webpage based on the new parsed index and without displaying the new parsed index.

In some instances, however, a link to the SERP is created and presented with the web browser, such as a one input link previously described, which may be rendered in the navigation control panel, with other object and or that is accessible through an unseen gesture. Then, in response to input selecting the link, the SERP will be displayed.

In some instances, the SERP is modified to reflect, with highlighting, coloring, or other techniques, that a link to a previously displayed webpage (linked and displayed through navigation with the suppressed index) was already accessed, even though it was not accessed from the SERP.

Once a user navigates to a next webpage, identified in the suppressed index, the browser will present a link to the particular webpage the user navigated away from (e.g., in the navigation control panel) while simultaneously displaying the next webpage and link to the SERP.

Disclosed embodiments also include generating and displaying a pivot link which, when selected, causes a display of a plurality of pivot icons, wherein each pivot icon is selectable and corresponds to a different content type, and wherein selection of any pivot icon of the plurality of pivot icons will cause the browser interface to identify one or more search engines that are capable of filtering for and providing search results of a corresponding content type related to said any selected pivot icon. In some instances, a first pivot icon included in the plurality of pivot icons corresponds to a first set of search engines and a second pivot icon included in the plurality of pivot icons corresponds to a second set of search engines that is different than the first set of search engines.

The plurality of pivot icons include, in at least some embodiments, at least three of: a general search pivot icon which corresponds to a set of search engines configured for obtaining and filtering internet search results associated with a plurality of content types; an image search pivot icon which corresponds to a set of search engines configured for obtaining and rendering internet search results associated with image content as a plurality of images that are selectable links to webpages associated with the images; a video search pivot icon which corresponds to a set of search engines configured for obtaining and rendering internet search results associated with video content as a plurality of video links to webpages associated with the video content; a shopping search pivot icon which corresponds to a set of search engines configured for obtaining and rendering internet search results associated with items available for sale; and a news search pivot icon which, when selected, identifies a first set of search engines configured to obtain and filter search results for news content.

Figure 28:
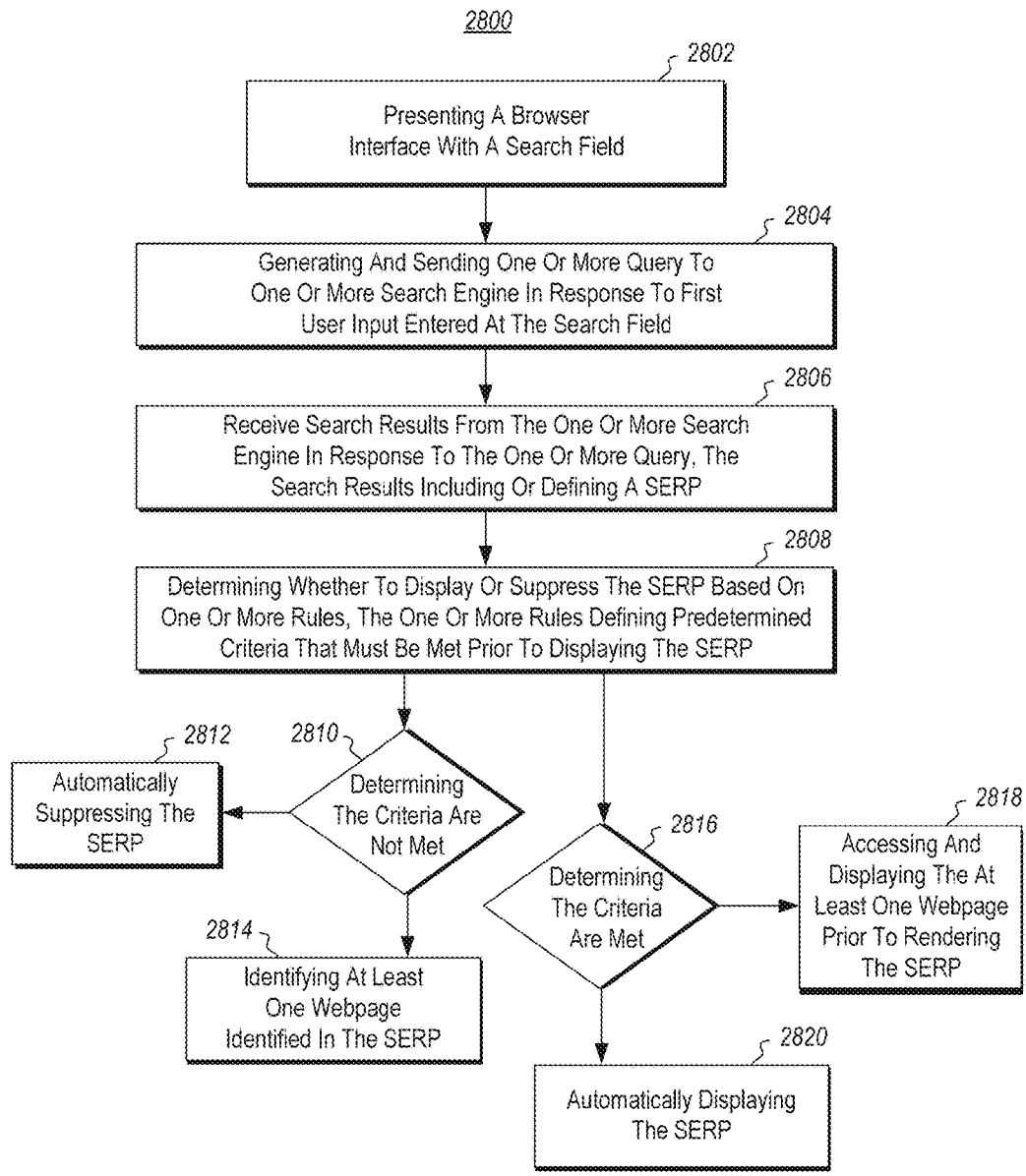
FIG. 28 illustrates a flow diagram of different acts that are associated with disclosed embodiments for accessing and navigating internet content with a browser and for determining when/whether to display a SERP corresponding to the search results.

FIG. 28 illustrates another flow diagram 2800 of different acts that are associated with disclosed embodiments for accessing and navigating internet content with a browser and for determining when/whether to display a SERP corresponding to the search results. In this embodiment, a browser dynamically controls when a SERP is displayed in response to a search request.

First, the browser interface is presented (act 2802), which generates and sends a search query to a search engine (act 2804) based on user input. The browser also receives search results from the search engine based on the search query, the search results including a SERP (act 2806). Then, prior to rendering the SERP, the browser determines whether to display or suppress the SERP based on one or more rules, the one or more rules defining predetermined criteria that must be met prior to displaying the SERP (act 2808). Thereafter, in response to determining the one or more rules are met, the browser displays the SERP, or else, in response to determining the one or more rules are not met, the browser automatically accesses and displays a webpage identified in the SERP (as referenced from the parsed/suppressed index, which is also generated from the SERP) prior to and without rendering the SERP.

In some instances, the one or more rules are not met. In other instances, they are met. Sometimes, the rules include determining that the search results correspond to a particular type of content, such as map content or contact information. This may be accomplished by parsing the SERP when the SERP is received and/or by detecting signals in the SERP that identify particular data to display with the SERP URL listing.

Figure 29:
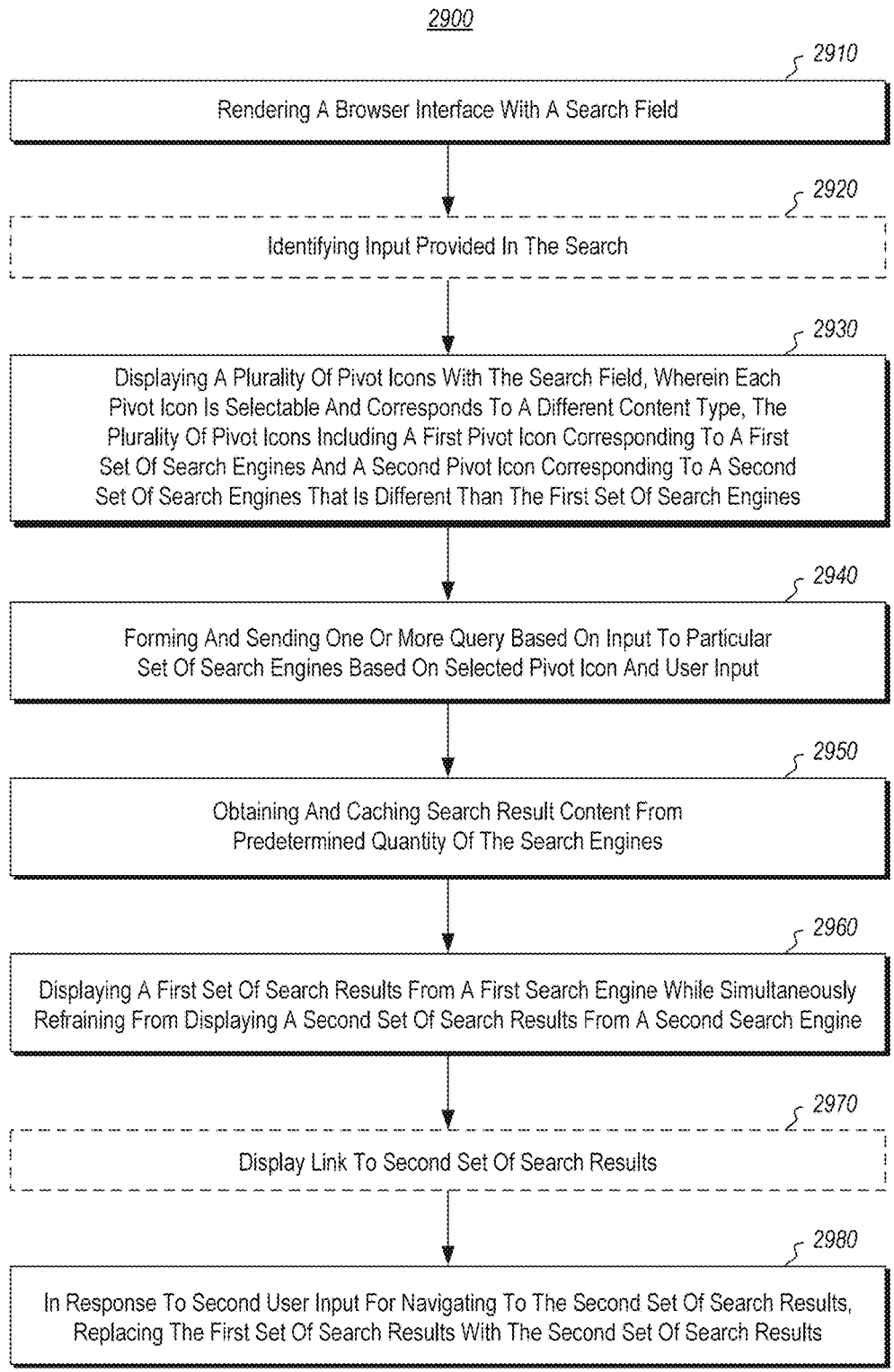
FIG. 29 illustrates a flow diagram of different acts that are associated with disclosed embodiments for accessing and navigating internet content with a browser that includes a plurality of pivot icons that are each associated with different types of content and different sets of search engines configured to provide search results corresponding to a respective type of content associated with a selected pivot icon, and wherein the browser also includes links for directly navigating (with one step/input navigation) between the different search engine results.

FIG. 29 illustrates another flow diagram of different acts that are associated with disclosed embodiments for accessing and navigating internet content with a browser that includes a plurality of pivot icons that are each associated with different types of content and different sets of search engines configured to provide search results corresponding to a respective type of content associated with a selected pivot icon, and wherein the browser also includes links for directly navigating (with one step/input navigation) between the different search engine results.

In these embodiments, the browser presents a browser interface with a search field (act 2910). Then, the browser identifies input provided in the search field (act 2920). This triggers (in some instances) the displaying a plurality of pivot icons, wherein each pivot icon is selectable and corresponds to a different content type (and corresponding/different set of search engines, in some instances), and wherein selection of any pivot icon of the plurality of pivot icons will cause the browser interface to identify a plurality of correspondingly related search engines that are capable of filtering for and providing search results of a corresponding content type related to said any selected pivot icon (act 2930). In other instances, the pivot icons are displayed with the search field and prior to receiving/detecting user input.

Then, in response to user input selecting a particular pivot icon of the plurality of pivot icons, the browser identifies a particular set of search engines that are each configured to filter for and present a unique set of search results of a particular content type corresponding to the particular pivot icon which was selected. This is part of the act of forming and sending one or more query based on the input to each of the particular set of search engines (act 2940).

Next, the browser obtains and caches content from each of a predetermined quantity of search engines from the particular set of search engines, wherein the content includes a first set of search results obtained and filtered by a first search engine responsive to the query (act 2950). The predetermined number of search engines may be different for each of the different pivot icons and may be customizable by a user specifying which search engines correspond to which pivot icons in one or more menu settings (not currently displayed in the drawings).

Then, the browser displays the first set of search results while simultaneously refraining from displaying a second set of search results that were obtained and filtered by a second search engine responsive to the user input, the first set of search results being displayed in a primary display frame of the browser interface (act 2960). This is shown in the drawings described above. Thereafter, in response to second user input for navigating to the second set of search results (e.g., selecting a link in the navigation control panel or in response to another navigation input), the browser replaces the first set of search results that were obtained and filtered by the first search engine with the second set of search results that were obtained and filtered by the second search engine, based on referencing the suppressed index that lists the different search engine results (e.g., SERP webpages). The second set of search results is also rendered in the in the primary display frame of the browser interface, effectively replacing the first set. However, in other embodiments, the second set of results is rendered in another window or tab of the primary browser window.

After displaying the first search results, the browser may also obtain and cache content from one or more predetermined quantity of different search engines included in the predetermined quantity of search engines (as referenced by the suppressed index) after displaying the first set of search results and prior to receiving the second user input.

In some embodiments, the browser also hides the plurality of pivot icons while displaying the first set of search results. The browser may also render a pivot access icon to the plurality of pivot icons. This pivot icon may be configured to change colors, in some embodiments, to reflect the selection state of a matching colored pivot icon.

In response to receiving user input directed at the pivot access icon/link, the browser renders a new display of the plurality of pivot icons, wherein the new display of the plurality of pivot icons renders the plurality of pivot icons with at least one of a different size or configuration than the plurality of pivot icons were initially presented with the initial presentation of the pivot icons with the search field.

Figure 30:
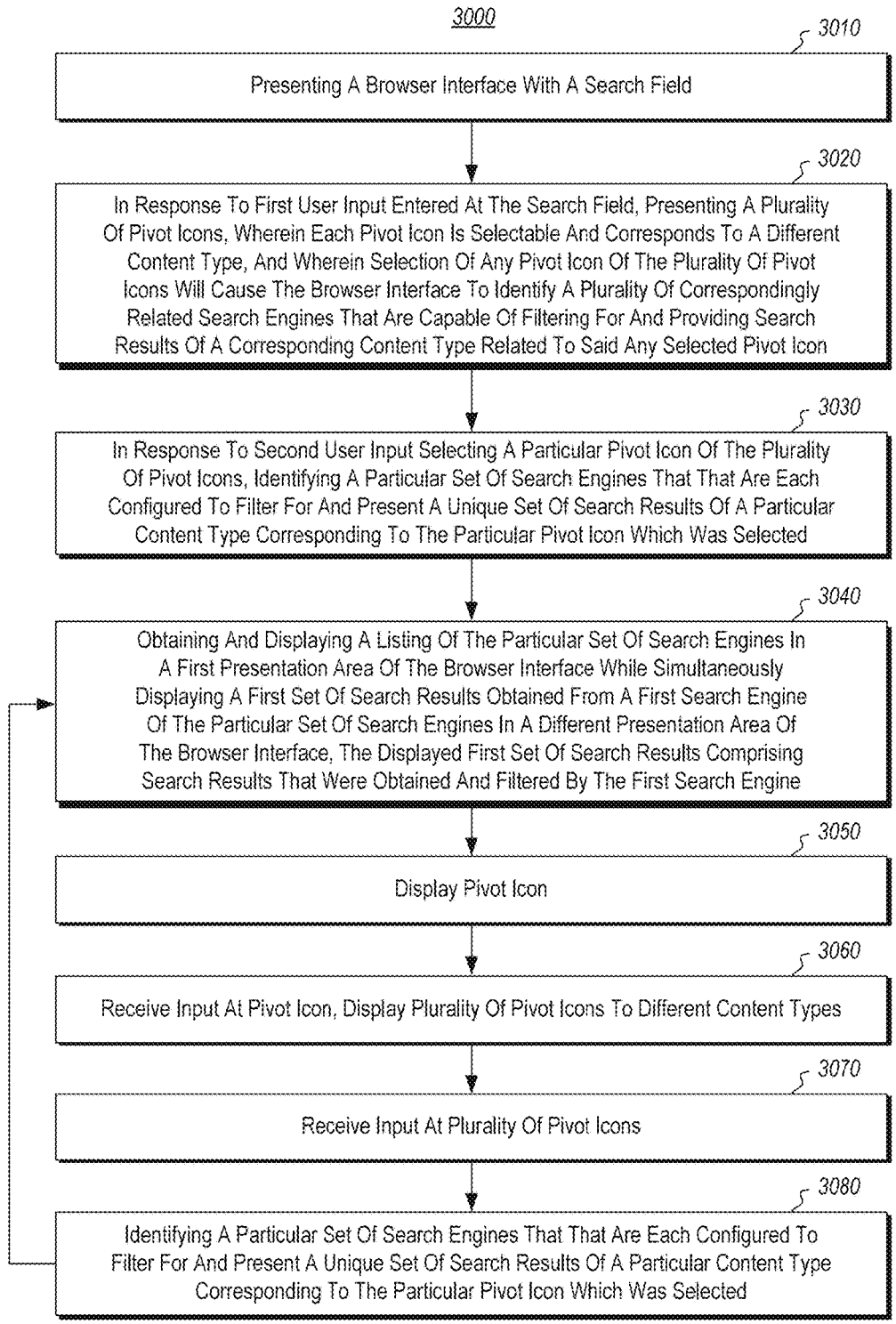
FIG. 30 illustrates another a flow diagram of different acts that are associated with disclosed embodiments for accessing and navigating internet content with a browser that includes a plurality of pivot icons that are each associated with different types of content and different sets of search engines configured to provide search results corresponding to a respective type of content associated with a selected pivot icon, and wherein the browser also includes links for directly navigating (with one step/input navigation) between the different search engine results.

FIG. 30 illustrates another flow diagram 3000 of different acts that are associated with disclosed embodiments for accessing and navigating internet content with a browser that includes a plurality of pivot icons that are each associated with different types of content and different sets of search engines configured to provide search results corresponding to a respective type of content associated with a selected pivot icon, and wherein the browser also includes links for directly navigating (with one step/input navigation) between the different search engine results.

In these embodiments, a browser presents a browser interface with a search field (act 3010). Then, in response to first user input entered at the search field, the browser presents a plurality of pivot icons, wherein each pivot icon is selectable and corresponds to a different content type, and wherein selection of any pivot icon of the plurality of pivot icons will cause the browser interface to identify a plurality of correspondingly related search engines that are capable of filtering for and providing search results of a corresponding content type related to said any selected pivot icon (act 3020).

Thereafter, in response to second user input selecting a particular pivot icon of the plurality of pivot icons, the browser identifies a particular set of search engines that that are each configured to filter for and present a unique set of search results of a particular content type corresponding to the particular pivot icon which was selected (act 3030). The browser also obtains and displays a listing of the particular set of search engines in a first presentation area of the browser interface (e.g., the navigation control panel that is built with links identified in the suppressed index) while simultaneously displaying a first set of search results obtained from a first search engine of the particular set of search engines in a different presentation area of the browser interface (based on referencing the suppressed index), the displayed first set of search results comprising search results that were obtained and filtered by the first search engine. (act 3040).

Then, in response to detecting input selecting (act 3060) another displayed pivot icon (act 3050), such as pivot access link, and/or in response to detecting input selection one of the plurality of presented pivot icons corresponding to different content types (act 3070), which are presented in response to the selection of the pivot access link and/or in response to other navigation input, the system identifies a second set of search engines that are configured for rendering content of the newly selected content type (e.g., new pivot icon). In this regard, the user is able to pivot between different types of content, as described above. This type of pivoting may include storing different suppressed indexes, one for each type of content type, each of which may correspond to different sets of search indexes and webpages in the suppressed indexes. The different indexes may be generated dynamically, in response to a user selecting a different pivot and which triggers a new search based on the content type of the selected pivot.

It will be noted that is a different type of pivot than the pivoting between links of search engines listed in a single suppressed index and that correspond to a single pivot/content type.

Each search and suppressed index may be based on results from a predetermined quantity of search engines, which may be the same or different than the search engines used to obtain results for the first pivot search and corresponding suppressed index.

Figure 31:
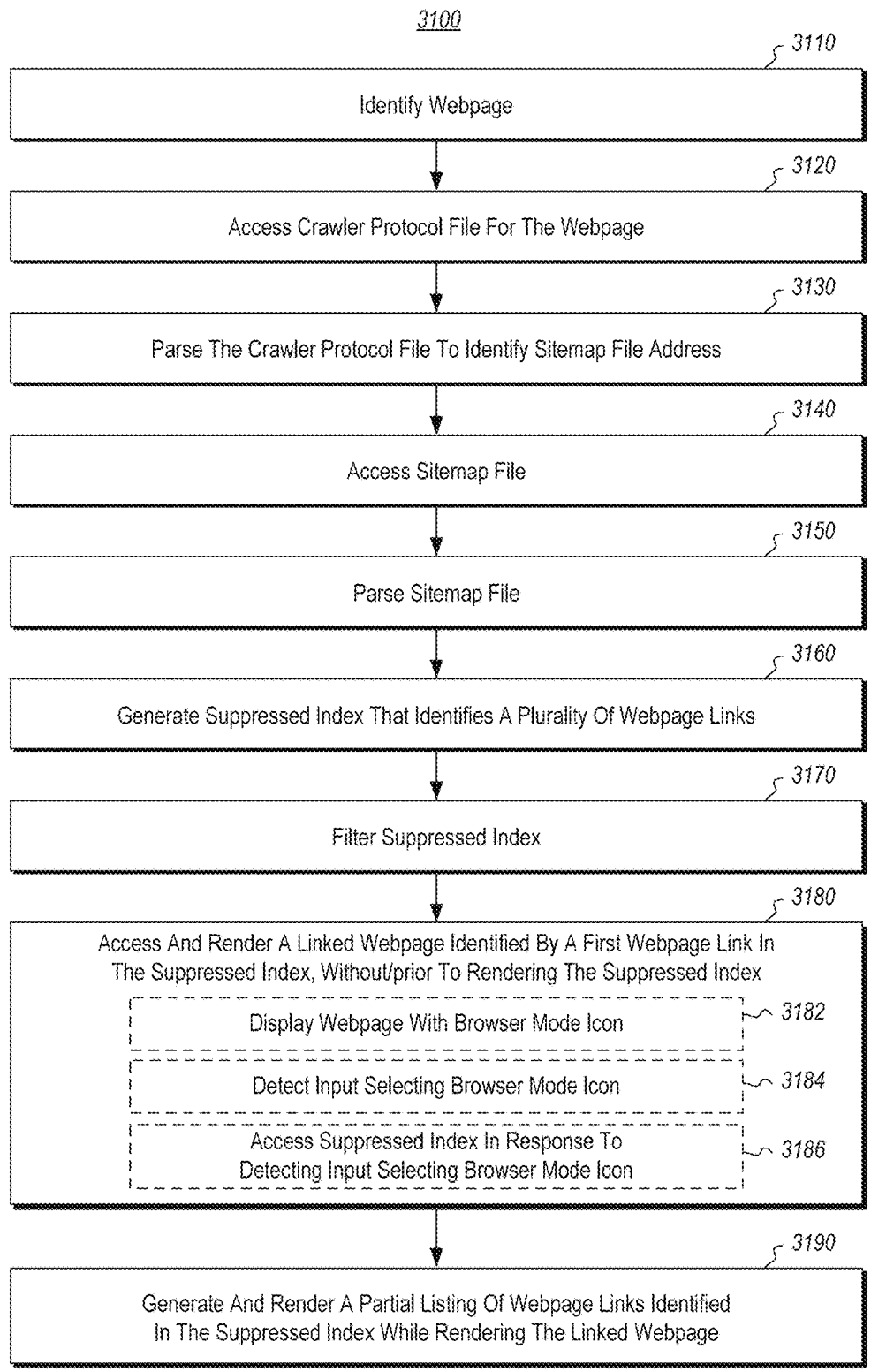
FIG. 31 illustrates a flow diagram of different acts that are associated with disclosed embodiments for generating a suppressed index that is based off of a crawler protocol file and a linked sitemap file, as well as for facilitating navigation of the corresponding linked webpages with the suppressed index.

FIG. 31 illustrates another flow diagram 3100 of different acts that are associated with disclosed embodiments for generating a suppressed index that is based off of a crawler protocol file and a linked sitemap file, as well as for facilitating navigation of the corresponding linked webpages with the suppressed index.

In these embodiments, the system identifies a particular webpage that includes a plurality of links to other webpages (act 3110). The system also accesses a crawler protocol file (such as a robots.txt file) for the particular webpage (act 3120) and parses the crawler protocol file to find an index file (such as a sitemap.XML file) from among other listed webpage files identified in the crawler protocol file (act 3130). The sitemap.XML file or other identified index file is associated with the particular webpage and identifies webpage addresses for the other webpages that are linked to by the particular webpage. Once the system accesses the sitemap.XML file or other index file (act 3140), the system parses the index/sitemap file to identify a plurality of webpage links corresponding to the other webpages (act 3150).

The system also generates an index that identifies the plurality of webpages and suppresses that index in memory, without displaying the index by the browser (act 3160). The suppressed index is also filtered, in some instances, to omit one or more webpage links from the suppressed index, as previously described (act 3170).

After the index is suppressed, the browser renders a webpage identified in the suppressed link, such as a first referenced webpage (act 3180). This act may include corresponding sub-acts of displaying a particular webpage with a browser mode icon (act 3182), detecting input selecting the browser mode icon (act 3184), accessing the suppressed index in response to detecting the input selecting the browser mode icon (act 3186).

The system also accesses and displays a set of one or more webpages identified in the suppressed index (in one or more corresponding tabs, for example), which are linked/referenced by the particular webpage, and prior to receiving user input selecting the one or more of the plurality of links to those webpages from the particular webpage. This is shown and described in reference to FIGS. 21-23.

In some embodiments, the system can also access and display the particular set of one or more webpages prior to displaying the particular webpage. This could occur, for example, in response to starting the browser in the Cake browser mode before entering the URL of the particular webpage into the URL field.

In some instances, the system only accesses and parses the index file and accessing and displaying the particular set of one or more webpages only occurs in response to the system determining/identifying a predetermined quantity of webpage addresses exist for the referenced/other webpages that are linked to in the particular webpage. This way, the system conserves resources when, for instance, the webpage does not link a sufficient quantity of related links/webpages to justify the parsing of the web crawler and sitemap files.

In some instances, the different webpages identified in the sitemap.XML file are hosted by the same domain that is hosting the particular webpage. In other instances, the linked/referenced webpages are hosted by different domains.

When multiple webpages are linked and identified in the sitemap file, the suppressed index is built and used to generate and display a navigation control panel with selectable links to at least some of the multiple different webpages included in the listing of webpages in the sitemap file and suppressed index. Each link in the navigation control panel is a selectable object that, when selected, each causes the browser to navigate to a different webpage associated with the corresponding selected link/object. In this manner, the suppressed index is used to control navigation of the linked content, even though the suppressed index is not displayed and, in some instances, without requiring the user to select the linked content from the initial webpage that references the linked content.

Figure 32:
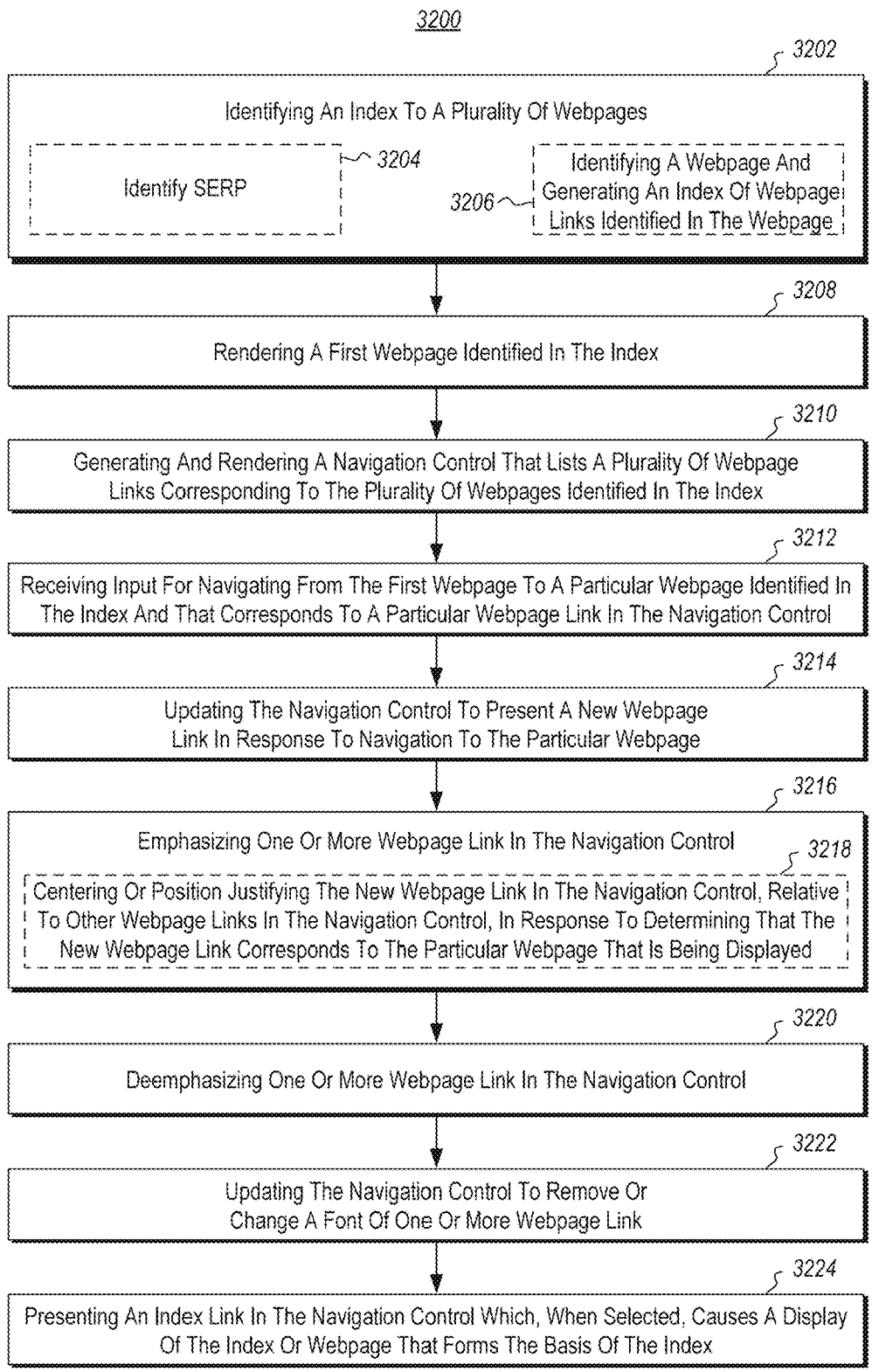
FIG. 32 illustrates a flow diagram of different acts that are associated with disclosed embodiments for utilizing and modifying a navigation control panel that includes links to a suppressed index and for navigating the corresponding webpages identified in the suppressed index.

FIG. 32 illustrates another flow diagram 3200 of various acts that are associated with disclosed embodiments for utilizing and modifying a navigation control panel that includes links to a suppressed index and for navigating the corresponding webpages identified in the suppressed index.

In these embodiments, the system identifies an index to a plurality of webpages (act 3202). This index can include a SERP (3204) or an index built off of a webpage (as described in FIG. 31) (3206). The system also accesses and renders a first webpage identified in the index (act 3208). The system also generates and renders a navigation control panel that lists a plurality of webpage links corresponding to the plurality of webpages identified in the index, each of the plurality of webpage links being configured, when selected, to cause the browser to navigate to a webpage corresponding to a selected webpage link (act 3210).

Then, in response to receiving input for navigating from the first webpage to a particular webpage identified in the index and that corresponds to a particular webpage link in the navigation control panel (act 3212), the system updates the navigation control panel to present a new webpage link in response to navigation to the particular webpage (act 3214). This is shown in many of the Figures described above.

The system also emphasizes, in some embodiments, one or more webpage links in the navigation control panel relative to one or more other webpage links in the navigation control panel (act 3216), such as by centering or justifying a webpage link in the navigation control panel and/or changing a font and/or size of a webpage link in the navigation control panel (act 3218).

In some embodiments, the system also emphasizes a link by deemphasizing one or more other webpage links, such as by changing a font, size, transparency and/or position of the one or more other webpage links (act 3220).

The system also, in some embodiments, updates the navigation control panel by removing at least one webpage link from the navigation control panel (act 3222).

In some embodiments, the navigation control panel or other component of the browser interface also includes a selectable link to the suppressed index, SERP, or the webpage that was used to form the suppressed index (act 3224). This link may be presented with at least one secondary webpage that was linked to by the primary webpage and that was displayed without a user selecting a link to the secondary webpage from the primary webpage (which was used to form the suppressed index).

With regard to the foregoing methods, it will be appreciated that each of the foregoing methods may include more or less acts than those that are illustrated. Accordingly, it is not necessary for each embodiment illustrated in a particular flow diagram to include each of the illustrated acts. Furthermore, some embodiments include acts from multiple different flow diagrams. Accordingly, it will be appreciated that disclosed and claimed embodiments include any combination of the functionality and features described herein. Some features, for example, of the different browser interfaces may be combined.

Figure 33:
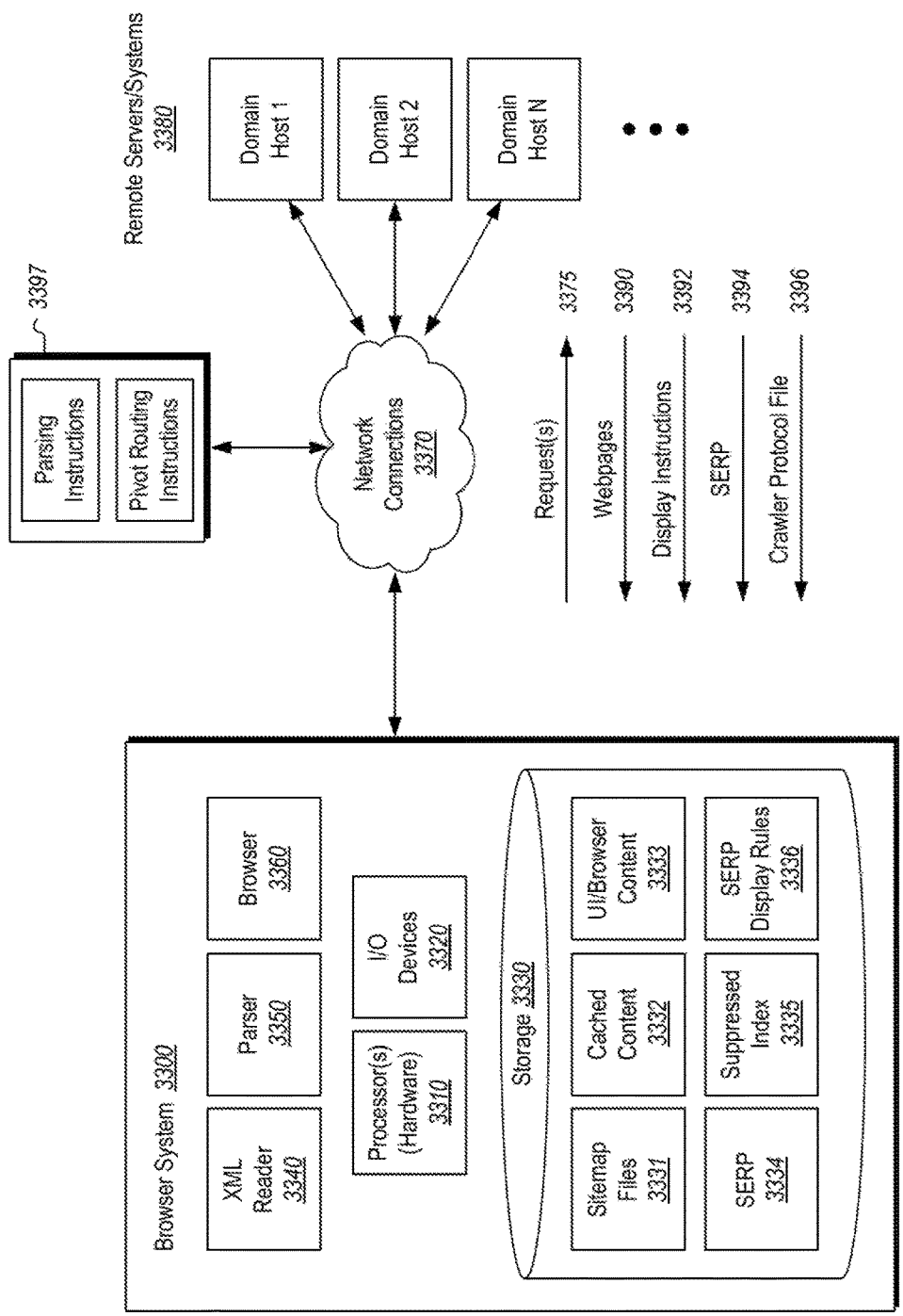
FIG. 33 illustrates a computer system that can be used to incorporate and/or to implement aspects of the disclosed embodiments, including embodiments related to the generation and use of suppressed indexes to facilitate navigation of content, as well as the embodiments related to the pivot icons and navigation controls described herein.

Attention will now be directed to FIG. 33, which illustrates an example of a computing environment with a computing system 3300 that may be used to implement aspects of the invention, including embodiments related to the generation and use of suppressed indexes to facilitate navigation of content, as well as the embodiments related to the pivot icons and navigation controls described herein.

As shown, the computing system 3300 (comprising a distributed or standalone computing system) includes one or more processors (e.g., CPU(s), GPU(s), etc.) 3310 and various I/O devices 3320 (e.g., I/O displays, including touch sensitive screens, interfaces, speakers, cameras, microphones and/or keyboards, etc.). The computing system 3300 can be a mobile device, a cell phone, a phablet, a tablet, a notebook computer, a desktop computer, a kiosk, a television or any other device configured with the components described herein and that is configured to implement the functionality described herein.

The processors 3310 access and execute computer-executable instructions stored within the storage 3330 (which may be volatile and/or non-volatile storage) and which may include system memory, to cause various functions to be performed, such as the acts recited in the embodiments described herein.

The storage 3330 also contains code and stored data structures, for example, to instantiate or operate the browsers and browser components described herein, as well as to generate and utilize the suppressed indexes and navigation controls described herein.

The storage 3330 also contains sitemap files 3331, cached content 3332 from remote systems and locally generated data, UI/Browser content 3333, SERP structures 3334, suppressed indexes 3335, rules for displaying SERP 3336 and other indexes, as well as other structures and modules that are used for implementing the claimed functionality, including browsing histories, pivot access histories, user preferences and profiles that are referenced for controlling the manner in which the interfaces are presented to the user(s). The storage can also include parsing instructions and pivot routing instructions, which may also be stored in an edge server or other remote server (e.g., other system 3397) between the browser system 3300 and other remote servers that contain the content that is provided to the browser system 3330. In some instances, the storage is a distributed storage and some of the stored contents are maintained in one or more remote computing systems (e.g., 3380, 3397, etc.).

The computing system interfaces through one or more network connections 3370 with one or more remote computing systems 3380 and/or other system(s) 3397 to perform search queries, to obtain search results, to parse search results, to generate indexes, to navigate indexed content and to perform the other functionality described herein. The remote servers/systems 3380 may include various dedicated or distributed domain hosts, including search engines and the systems hosting the search engines described herein. Communications passing between the browser system 3300 and the remote systems 3380 include search requests 3375, webpages 3390 and other related content, display instructions 3392, SERP structures, crawler protocol files 3396, sitemap files 3398 and other content that is utilized to implement the aspects of the invention described herein.

The browser system 3300 also includes an XML, reader 3340, a parser 3350, browser 3360 and other applications and modules that may be stored in the storage and/or that may be implemented by specialized hardware (e.g., NIC, ASIC or other hardware). The XML reader 3340 is configured to read sitemap XML files and other XML structures. When the sitemap files described herein are in a format other than XML, the XML reader 3340 is configured with code that corresponds to and that is capable of parsing and reading the sitemap files. The parser 3350 is configured to parse different structures, including SERP structures, web crawler protocol files and the indexes described herein to identify links to content and to identify instructions for rendering content. The browser 3360 is configured as an application with interfaces and components, as described herein, that accept user input and that display output corresponding to the user input. The browser is also configured to interface with the other system 3300 components and remote systems to perform the functionality described herein.

As described herein, systems are provided for enabling a user to navigate content between search engine results, navigate SERP results, and navigate linked content on a webpage, without requiring the user to submit multiple queries and/or without requiring the user to continually return to the original SERP or webpage to access the linked content. In fact, a user can navigate through a plurality (2, 3, 4 or more) webpages linked in a SERP or other index that reference the webpages being navigated and without ever displaying the SERP or without displaying the other index which is used and referenced by the browser to perform the navigation. In this regard, the disclosed embodiments facilitate continuous navigation from a suppressed/hidden index, without displaying the index during the navigation. This greatly improves the efficiency for navigating internet content, particularly on mobile devices and particularly when the linked content is hosted by different domains.

It will be appreciated that the foregoing embodiments provide significant advantages over tools like the I'm Feeling Lucky tool by Google which randomizes or modifies a search to provide a result that the engine believes is a desired target by simply providing a highest matching result or that is based on a targeted profile setting and which does this without suppressing any index, particularly an index that continues to be navigable (and suppressed from view, while one or more of the index results are loaded into memory for expedited navigation). Instead, if the results are not what the user wants, they have to go back to the browser's main page or a SERP to navigate to another page. The I'm Feeling Lucky tool and other similar tools do not provide any mechanism for accessing and caching, in memory, the results from a search query, while also suppressing the SERP index from the user, and while enabling the user to navigate through the cached content, as described by the methods and systems provided in this disclosure.

The disclosed embodiments are also quite different than the Stumble Upon tools/widgets that enable a user to click a button to navigate to a random page. While this tool may enable navigation without displaying a SERP index, this tool also fails to provide a user the ability to query for a desired search result that is associated with an index that is navigable (while being suppressed).

The disclosed embodiments are also quite different than a frame or other interface tool that is simply layered over a browser. While there are embodiments of the disclosure that can certainly utilize frames for presenting content, the disclosed querying, parsing, and (sometimes) navigation are, preferably, performed above the page DOM (Document Object Model), as part of the browser. This is beneficial, because it enables suppression of the index and controlled display of the navigated content through the browser, which might otherwise be capable of breaking out of a frame.

In some alternative embodiments, however, a frame may be used to intercept content being displayed and to suppress the content (e.g., index) before it is displayed, while redirecting the display to linked content associated with the suppressed content. The navigation dashboard may also be provided with a frame, or alternatively, be presented directly as part of the browser tool palette.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry computer-executable instructions without storing the computer-executable instructions in a recordable-type media. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It will be appreciated that the scope of this disclosure includes computer program products comprising one or more storage devices having stored computer-executable instructions which are executable by one or more processors of a computing system for causing the computing system to implement the methods and functionality described herein. Likewise, the disclosed embodiments include computing system(s) comprising one or more processors and one or more storage devices having stored computer-executable instructions which are executable by the one or more processors for causing the computing system(s) to implement the methods and functionality described herein.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method implemented by a browser for obtaining search results from a search engine and for navigating content received in the search results, the method comprising:

generating and sending a search query to a search engine in response to first user input;

receiving search results from the search engine based on the search query, the search results comprising a SERP (search engine result page) that comprises a listing of a plurality of webpages related to the search query and that are ranked according to a relevance determined by the search engine;

prior to and without displaying the SERP or any webpages from the SERP, parsing the SERP to generate a parsed index that is a different listing of webpages included in the SERP and that is used by the browser for subsequent navigation to one or more webpages of the plurality of webpages, wherein the parsed index omits at least one webpage that was included in the listing of the SERP;

without displaying the parsed index, suppressing the parsed index in memory outside of a DOM (document object model) of the browser that is used to display the one or more webpages referenced by the SERP, such that the parsed index is stored in memory as a hidden parsed index outside of the DOM;

without rendering the hidden parsed index or the SERP, identifying a particular webpage included in the hidden parsed index and that was also identified in the SERP;

initiating a request for the particular webpage without rendering the hidden parsed index or the SERP; and accessing the particular webpage and using the DOM of the browser to display the particular webpage, automatically, and prior to receiving any subsequent user input after the first user input that triggered the generating and sending of the search query to the search engine, and without rendering the hidden parsed index and prior to rendering the SERP;

still without rendering the hidden parsed index and prior to rendering the SERP, receiving subsequent user input after the first user input for triggering navigation to a different webpage referenced in the hidden parsed index; and still without rendering the hidden parsed index and prior to rendering the SERP, in response to the subsequent user input, accessing and displaying the different webpage referenced in the hidden parsed index.

2. The method of claim 1, wherein the method further includes presenting a one input link to the SERP with the display of the particular webpage and with the display of the different webpage.

3. The method of claim 1, wherein the search query is based on user input entered at browser of the search engine hosted by a first domain and wherein the particular webpage is rendered independently from the first domain and by a second domain.

4. The method of claim 2, wherein the one input link to the SERP, comprises an undisplayed swipe gesture link.

5. The method of claim 2, wherein the one input link to the SERP, comprises a displayed object.

6. The method of claim 1, wherein the method further includes presenting a link to one or more different webpages identified in the particular listing of webpages while simultaneously displaying the particular webpage.

7. A computer program product comprising one or more storage devices having stored computer-executable instructions which are executable by one or more processors of a computing system for causing the computing system to implement a method for obtaining search results from a search engine and for navigating content received in the search results, the method comprising:

generating and sending a search query to a search engine in response to first user input;

receiving search results from the search engine based on the search query, the search results comprising a SERP (search engine result page) that comprises a listing of a plurality of webpages related to the search query and that are ranked according to a relevance determined by the search engine;

prior to and without displaying the SERP or any webpages from the SERP, parsing the SERP to generate a parsed index that references is a different listing of webpages included in the SERP and that is used by the browser for subsequent navigation to one or more webpages of the plurality of webpages, wherein the parsed index omits at least one webpage that was included in the listing of the SERP;

without displaying the parsed index, suppressing the parsed index in memory outside of a DOM (document object model) of the browser that is used to display the one or more webpages referenced by the SERP, such that the parsed index is stored in memory as a hidden parsed index outside of the DOM;

without rendering the hidden parsed index or the SERP, identifying a particular webpage included in the hidden parsed index and that was also identified in the SERP;

initiating a request for the particular webpage without rendering the hidden parsed index or the SERP; and accessing the particular webpage and using the DOM of the browser to display the particular webpage, automatically, and prior to receiving any subsequent user input after the first user input that triggered the generating and sending of the search query to the search engine, and without rendering the hidden parsed index and prior to rendering the SERP;

still without rendering the hidden parsed index and prior to rendering the SERP, receiving subsequent user input after the first user input for triggering navigation to a different webpage referenced in the hidden parsed index; and still without rendering the hidden parsed index and prior to rendering the SERP, in response to the subsequent user input, accessing and displaying the different webpage referenced in the hidden parsed index.

8. The computer program product of claim 7, wherein the method further includes presenting a one input link to the SERP with the display of the particular webpage and with the display of the different webpage.

9. The computer program product of claim 7, wherein the search query is based on user input entered at browser of the search engine hosted by a first domain and wherein the particular webpage is rendered independently from the first domain and by a second domain.

10. The computer program product of claim 8, wherein the one input link to the SERP, comprises an undisplayed swipe gesture link.

11. The computer program product of claim 8, wherein the one input link to the SERP, comprises a displayed object.

12. The computer program product of claim 7, wherein the method further includes presenting a link to one or more different webpages identified in the particular listing of webpages while simultaneously displaying the particular webpage.

13. A computing system comprising:
one or more processors; and
one or more storage devices having stored computer-executable instructions which are executable by the one or more processors for causing the computing system to implement a method for obtaining search results from a search engine and for navigating content received in the search results, the method comprising:
generating and sending a search query to a search engine in response to first user input;
receiving search results from the search engine based on the search query, the search results comprising a SERP (search engine result page) that comprises a listing of a plurality of webpages related to the search query and that are ranked according to a relevance determined by the search engine;
prior to and without displaying the SERP or any webpages from the SERP, parsing the SERP to generate a parsed index that is a different listing of webpages included in the SERP and that is used by the browser for subsequent navigation to one or more webpages of the plurality of webpages, wherein the parsed index omits at least one webpage that was included in the listing of the SERP;
without displaying the parsed index, suppressing the parsed index in memory outside of a DOM (document object model) of the browser that is used to display the one or more webpages referenced by the SERP, such that the parsed index is stored in memory as a hidden parsed index outside of the DOM;
without rendering the hidden parsed index or the SERP, identifying a particular webpage included in the hidden parsed index and that was also identified in the SERP;
initiating a request for the particular webpage without rendering the hidden parsed index or the SERP; and
accessing the particular webpage and using the DOM of the browser to display the particular webpage, automatically, and prior to receiving any subsequent user input after the first user input that triggered the generating and sending of the search query to the search engine, and without rendering the hidden parsed index and prior to rendering the SERP;
still without rendering the hidden parsed index and prior to rendering the SERP, receiving subsequent user input after the first user input for triggering navigation to a different webpage referenced in the hidden parsed index; and
still without rendering the hidden parsed index and prior to rendering the SERP, in response to the subsequent user input, accessing and displaying the different webpage referenced in the hidden parsed index.

14. The computing system of claim 13, wherein the method further includes presenting a one input link to the SERP with the display of the particular webpage and with the display of the different webpage.

15. The computing system of claim 13, wherein the search query is based on user input entered at browser of the search engine hosted by a first domain and wherein the particular webpage is rendered independently from the first domain and by a second domain.

16. The computing system of claim 14, wherein the one input link to the SERP, comprises an undisplayed swipe gesture link.

17. The computing system of claim 14, wherein the one input link to the SERP, comprises a displayed object.

18. The computing system of claim 13, wherein the method further includes presenting a link to one or more different webpages identified in the particular listing of webpages while simultaneously displaying the particular webpage.

19. The method of claim 2, wherein the method further includes:
receiving new subsequent user input for selecting the one input link and without displaying the hidden parsed index, wherein the parsed index is different than the SERP; and
in response to the new subsequent user input, displaying the SERP for a first time subsequent to the display of the particular webpage and without displaying the hidden parsed index.

20. The method of claim 19, wherein the method further includes:
displaying a link to the different webpage along with the display of the particular webpage, along with at least two links to two additional webpages, respectively, which are identified in the hidden parsed index, and without displaying the hidden parsed index.

* * * * *